(12) United States Patent
Chou et al.

(10) Patent No.: US 9,807,640 B2
(45) Date of Patent: Oct. 31, 2017

(54) NETWORK OPERATING SYSTEM RESOURCE COORDINATION

(71) Applicant: Taiwan Semiconductor Manufacturing Company, Ltd, Hsinchu (TW)

(72) Inventors: Chie Ming Chou, Taiwan (CN); Ching-Yao Huang, Taiwan (CN)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 558 days.

(21) Appl. No.: 14/451,874

(22) Filed: Aug. 5, 2014

(65) Prior Publication Data
US 2015/0173084 A1 Jun. 18, 2015

Related U.S. Application Data

(60) Provisional application No. 61/917,263, filed on Dec. 17, 2013.

(51) Int. Cl.
*H04W 52/00* (2009.01)
*H04W 28/02* (2009.01)
(Continued)

(52) U.S. Cl.
CPC ....... *H04W 28/0221* (2013.01); *H04L 5/0032* (2013.01); *H04L 5/0037* (2013.01); *H04L 41/0893* (2013.01); *H04W 52/0222* (2013.01); *H04W 72/1257* (2013.01); *H04L 43/0888* (2013.01); *H04W 24/08* (2013.01); *H04W 72/048* (2013.01); *Y02B 60/50* (2013.01)

(58) Field of Classification Search
CPC ......... H04W 28/0215; H04W 28/0221; H04W 52/0212; H04W 52/0222; H04W 72/1205; H04W 72/1257; H04L 5/0032; H04L 41/0893
See application file for complete search history.

(56) References Cited

U.S. PATENT DOCUMENTS

2006/0019677 A1* 1/2006 Teague .................... H04L 47/14
455/456.3
2006/0164972 A1* 7/2006 van Rensburg ...... H04B 7/0408
370/208

(Continued)

OTHER PUBLICATIONS

Ghimire, et al., "Resource Allocation, Transmission Coordination and User Association in Heterogeneous Networks: A Flow-Based Unified Approach," IEEE Trans. on Wireless Communication, vol. 12, issue:3, Feb. 2013, 12 pages.

(Continued)

*Primary Examiner* — Ian N Moore
*Assistant Examiner* — Ronald H Davis
(74) *Attorney, Agent, or Firm* — Haynes and Boone, LLP

(57) ABSTRACT

Network device coordination schemes allocate resources, configure transmission policies, and assign users to utilize resources. A set of transmission policies is generated to services users while each user maintains a throughput threshold. The set of transmission policies can be altered to alter a network energy efficiency. The set of transmission polices can be altered based on energy consumption, data throughput, channel characteristics, measured interference, and the like.

37 Claims, 13 Drawing Sheets

(51) Int. Cl.
| | |
|---|---|
| *H04L 5/00* | (2006.01) |
| *H04W 52/02* | (2009.01) |
| *H04L 12/24* | (2006.01) |
| *H04W 72/12* | (2009.01) |
| *H04W 72/04* | (2009.01) |
| *H04W 24/08* | (2009.01) |
| *H04L 12/26* | (2006.01) |

(56) References Cited

U.S. PATENT DOCUMENTS

| | | | |
|---|---|---|---|
| 2007/0042784 A1* | 2/2007 | Anderson | H04W 52/34 455/450 |
| 2008/0146241 A1* | 6/2008 | Das | H04L 1/0002 455/450 |
| 2011/0077041 A1* | 3/2011 | Kwon | H04W 52/26 455/509 |
| 2017/0150511 A1* | 5/2017 | Chmiel | H04W 72/12 |

OTHER PUBLICATIONS

Li, et al., "Energy Efficiency Analysis of Small Cell Networks," Proc. IEEE International Conference on Communications, Jun. 2013, 5 pages.

Zhu, et al., "Energy-Efficient User Association for Heterogenous Cloud Cellular Networks" GC'12 Workshop: International Workshop on Cloud Base-Station and Large-Scale Cooperative Communications, pp. 273-278, Dec. 2012.

Kaneko, et al., "Proportional Fairness in Multi-Carrier System with Multi-Slot Frames: Upper Bound and User Multiplexing Algorithms," IEEE Transactions on Wireless Communications, vol. 7, No. 1, Jan. 2008, 5 pages.

Dimopoulos, et al., "Recent developments in evolutionary computation for manufacturing optimization: problems, solutions and comparisons", IEEE Transactions on Evolutionary Computation, vol. 4, No. 2, Jul. 2000, 21 pages.

Soh, et al., "Energy Efficient Heterogeneous Cellular Networks," IEEE Journal on Selected Areas in Communications, vol. 31, No. 5, May 2013, 11 pages.

Khirallah, et al, "On Energy Efficiency of Joint Transmission Coordinated Multi-Point in LTE-Advanced" IEEE 2012 International ITG Workshop on Smart Antennas (WSA)—Dresden, Germany, Mar. 2012, 8 pages.

3GPP—3rd Generation Partnership Project. "Technical Specification Group Radio Access Network; Small Cell Enhancements for E-UTRA and E-UTRAN Physical Layer Aspects" (Release 12) TR 36.872 V0.1.0, Apr. 2013, 26 pages.

\* cited by examiner

NETWORK OPERATING SYSTEM RESOURCE COORDINATION

PRIORITY CLAIM

This application claims priority to U.S. Provisional Patent Application No. 61/917,263, filed on Dec. 17, 2013, entitled "HEURISTIC PROPORTIONAL FAIRNESS SCHEDULING ALGORITHM FOR ENERGY-EFFICIENT TRANSMISSION IN COLLABORATIVE SMALL CELLS." The entirety of the aforementioned application is incorporated herein by reference.

TECHNICAL FIELD

This disclosure relates generally to wireless network systems, for example, to mobile device resource provisioning schemes in wireless networks based on a heuristic fairness scheme.

BACKGROUND

The use of mobile devices and the resulting mobile traffic continues growing at a very fast pace and the trend shows no signs of stopping. To meet the mobile traffic growth and improve the end user experience, mechanisms are desired to improve network efficiency, system capacity, and end user experience by cost effectively leveraging radio network technologies. The routing of network traffic to a Wi-Fi radio and to a cellular radio, for example, can affect the user experience. For example, if the network traffic is routed to a network that is not appropriate for that network traffic, it can result in loss of the communication (e.g., dropped calls), poor services, and other negative impacts to the user experience.

To guarantee quality of service (QoS), a feasible cell selection scheme can enable small cells to associate with a base station (BS) that possesses the best channel and network conditions. In high-speed downlink packet access (HSDPA), fast cell selection (FCS) allows small cells to maintain an active set which contains the candidate BSs, and the small cell selects the serving BS (SBS) with the strongest pilot signal in the active set. The idea of FCS can be further applied into OFDMA networks for the LTE-A standard to facilitate the SBS selection in heterogeneous networks. To ensure customer satisfaction, network providers aim to deliver a high quality service at any location, and to facilitate reliable and efficient mobile communications. Consumers can access a growing number of networks using a mobile device and still receive QoS by reducing handover time delay and communication overheads in the network.

Nevertheless, the use of small cells can increase power consumption of a network. Over the past few decades there has been an increased focus on green technology and reducing energy consumption to benefit the environment. Reducing energy consumption can also have a positive economic effect as cost is reduced.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

Various systems, methods, and apparatus are described with control algorithms to facilitate resource management based on a heuristic proportional fairness scheduling algorithm. Small cell resources are provisioned to user equipment devices based on a fairness scheme and energy efficiency scheme. Resources of small cells are selected and allocated to user equipment devices. Transmissions are coordinated to provide for fairness that maintains a quality of service and user equipment throughput while satisfying an energy efficiency metric. A set of transmission polices can be generated to form a coordination agreement. Coordination agreements can be altered to improve energy efficiency while meeting a fairness requirement.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
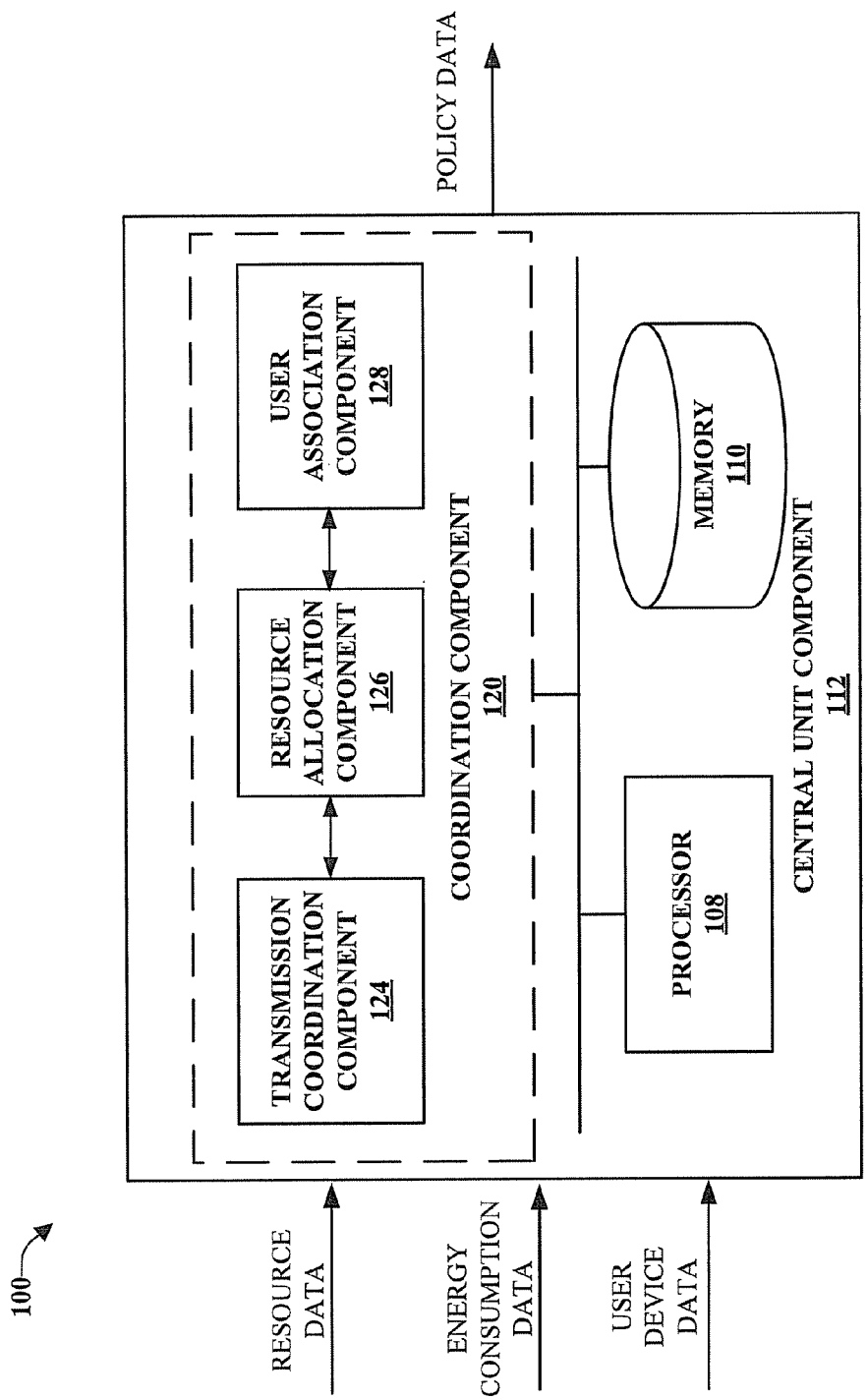
FIG. 1 illustrates an example, non-limiting network system for coordinating transmissions, resources, and user equipment device assignments, according to aspects disclosed herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, by scenario identification component to infer a starvation scenario present in a Wi-Fi network in real-time. Furthermore, the artificial intelligence system can be used, by a heuristic component to automatically determine heuristic probabilities associated with possible modifications to operating parameters that could alleviate an identified starvation scenario.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Aspects of the subject disclosure will now be described more fully hereinafter with reference to the accompanying drawings that illustrate different example embodiments. In the following description, for purposes of explanation, numerous specific details are set forth in order to provide a thorough understanding of the various embodiments. However, the subject disclosure can embody many different forms and should not be construed as limited to the example embodiments set forth herein.

Moreover, terms such as "mobile device equipment," "mobile station," "mobile," "subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS), femto cell device," "Node B (NB)," "evolved Node B (eNode B)," "home Node B (HNB)," "small cell," "small cell device," "metro cell device," "micro cell" and "macro cell device" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows. Further, the terms "femto" and "femto cell," the terms "macro" and "macro cell," and the terms "micro" and "micro cell" are used interchangeably.

Furthermore, the terms "user equipment," "user equipment device," "user," "mobile device," "subscriber," "customer," "consumer," "end user" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

In another aspect, a small cell (e.g., femtocell, picocell, microcell, etc.) can refer to a low-powered radio access device that operates in licensed and unlicensed spectrum that have a specified range that can be smaller relative to other cells, such as a macro cell. In an example, small cells can have a range of, for example, a few meters (e.g., ten meters) or kilometers (e.g., one to two kilometers), compared to a mobile macro cell which might have a range of a few tens of kilometers. Small cells can be utilized for mobile data off-loading, in various technologies. For example, a small cell or set of small cells can be utilized by one or more base stations. The small cells can provide additional resources for offloading transmissions.

Due to bandwidth strain and poor user experience from rampant growth in wireless communications, managing and balancing radio access control to improve end user experience is desired. Embodiments described herein can be used in substantially any wireless communication technology, including, but not limited to, Orthogonal Frequency-Division Multiple Access communications (OFDMA), wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

Embodiments described herein can refer to the term "transmission policy." Such term, as utilized herein, can refer to a singular type of or iteration of a transmission policy, such as, a non-coordination policy, joint-transmission policy, or interference-coordination policy. In another aspect, a transmission policy can refer to policy selected for a singular user device, sub carrier (or set of subcarriers), or the link.

The terms "collaboration allocation policy," "collaboration allocation policies," and the like are employed interchangeably throughout, unless context warrants particular distinctions among the terms. Such terms can refer the union of operating sets of transmission policies associated with various user devices or subcarriers.

In another aspect, the terms "collaboration allocation agreements," "collaboration agreement policies," and the like are employed interchangeably throughout, unless context warrants particular distinctions among the terms. Embodiments here utilize such terms to refer to a collaboration allocation policy that is implemented and actually used to satisfy a defined threshold (e.g. optimal collaboration allocation policy).

The embodiments described herein provide methods, systems, and apparatus facilitating coordination of network resources to serve user equipment devices and maintain a spectrum efficiency and energy efficiency of the network. Spectrum efficiency of a network can represent a measured efficiency associated with utilization of network resources (e.g., sub-carriers of network devices) to service user equipment devices. Energy efficiency of a network can represent a measured efficiency of power consumption of network devices that service the user equipment devices. In an aspect, energy efficiency can be defined as a ratio of network throughput to a total cell power consumption. There is a tradeoff between spectrum efficiency and energy efficiency of the network. While dense small cell networks demonstrate spectrum efficiency they also demonstrate poor energy efficiency. Embodiments described herein can manage the tradeoff to improve energy efficiency while guaranteeing a level of spectrum efficiency in sparsely populated networks (e.g., relatively few small cells) and densely populated networks (e.g., relatively many small cells). For example, energy efficiency can be maximized at a given level of spectrum efficiency. It is noted that maximizing can include near maximizing, achieving a threshold level of efficiency that is determined to be acceptable, and the like.

In an embodiment, a system, for example, can comprise a memory storing executable components and a processor that executes or facilitates execution of the executable components. The executable components can comprise, for example, comprise a central unit component. The central unit can be located at a macro base station with a unified baseband pool. In embodiments, a central unit component can coordinate transmissions of connected network devices (e.g., small cells) according to a heuristic proportional fairness scheduling scheme. In an aspect, a central unit component can determine transmission policies, allocation polices, and user association policies to maintain a determined energy efficiency while guaranteeing a determined available throughput (e.g., data rate) for each user equipment device served by the network.

A heuristic proportional fairness scheduling scheme can facilitate application (and/or assignment) of transmission policies by user equipment devices utilizing a sub-carrier of a determined network device. Each network device can have a set of sub-carriers which are allocated according the heuristic proportional fairness scheduling scheme. The policies can alter based on time, frequency, altering of user equipment association to network devices, and the like. A set of transmission polices, user associations with sub-carriers and network devices, and resource allocations can be considered as a collaboration allocation set for a given time. The heuristic proportional fairness scheduling scheme can iterate generation of collaboration allocation sets until an energy efficiency threshold and fairness threshold are reached. In another aspect, the heuristic proportional fairness scheduling scheme can generate collaboration allocation sets any number of times and can select a collaboration allocation set(s) for utilization and schedule communications based on the collaboration allocation set(s).

In another embodiment, a method can comprise instructing a system to coordinate transmissions of network devices, allocate of network resources, and associate user equipment devices with network devices. The method can facilitate the coordination according to a heuristic proportional fairness scheduling scheme. The heuristic proportional fairness scheduling scheme can operate to maximize an energy efficiency of a network or guarantee an energy efficiency of the network meeting a determined energy efficiency metric. In another aspect, the heuristic proportional fairness scheduling scheme can also guarantee a fairness of throughput associated with user equipment devices of the network regardless of user equipment's location. For example, the method can coordinating transmissions of network devices, allocation of network resources, and manage associations of user equipment devices to maintain an energy efficiency of the network devices and guarantee available data rates for each user equipment devices.

Referring now to FIG. 1, a system 100 is depicted. System 100 can coordinate transmissions, resources, and user equipment device assignments in a network. Embodiments disclosed herein, for example, generate collaboration allocation sets to achieve an energy efficiency threshold and throughput fairness threshold. Improving energy efficiency while maintaining a throughput fairness can maintain and/or increase a quality of service experienced by users while providing environmental and economic benefits. System 100 can include a central unit component 112. The central unit component 112 can include a memory 110 that stores computer executable components and a processor 108 that executes computer executable components stored in the memory 110. It is to be appreciated that the system 100 can be used in connection with implementing one or more of the systems or components shown and described in connection with other figures disclosed herein. It is noted that all or some aspects of system 100 can be comprised in larger systems such as servers, computing devices, base stations, and the like.

As depicted, central unit component 112 can include communicably coupled components such as coordination component 120. Coordination component 120 can facilitate creation of collaboration allocation sets ("collaboration allocation agreements," "collaboration allocation policies," "collaboration agreement policies," etc.) and the like. In an aspect, coordination component 120 can comprise a transmission coordination component 124 (which can coordinate transmissions to user equipment devices), a resource allocation component 126 (which can determine network resources to be allocated), and a user allocation component 128 (which can associate a user equipment device with a network device and/or sub-carrier). In one aspect, the central unit component 112 can balance or manage spectrum efficiency and energy efficiency by guaranteeing a user throughput at a certain rate (e.g., spectrum efficiency) while reducing network energy consumption (e.g., energy efficiency).

In an aspect, the central unit component 112 can be comprised at one or more of a base station device (macro base station), a mobility management entity, a serving gateway, a cloud radio access network entity, or the like. A unified baseband pool can be located at the macro base station device while collaborative small cells of a radio access network ("Cloud-RAN") are in communication with the macro base station. For example, small cell devices can be communicably coupled to a macro base station (e.g., fiber connection, copper connection, wireless connection, etc.). It is noted that the central unit component 112 can be comprised in other devices (e.g., small cells) or can be a standalone device.

Resource allocation component 126 can determine utilization of network resources and can allocate network resources as active or not active. For example, resource allocation component 126 can decide whether to utilize sub-carriers of network devices (small cells). It is noted that the resource allocation component 126 can determine whether a cell makes a transmission on a sub-carrier for each time period. A time period can comprise a time associated with slotted transmissions in an organized network. It is noted that in some embodiments, resource allocation component 126 can dedicate all network resources as active or inactive for all time periods. It is further noted that resource allocation component 126 can instruct network devices (e.g., cells) to dedicate a particular resource as active or inactive thereby reducing power consumption of the resource. In an aspect, resource allocation component 126 can transmit one or more instructions simultaneous, substantially simultaneous, at disparate times, and/or at overlapping times. The instructions can comprise a set of instructions indicating when to activate/deactivate network resources over a period of time. For example, an instruction can instruct a small cell to turn off a resource at a first time and keep the resource off until a second time. The activation or deactivation of network resources may be also periodic over a period of time.

Transmission coordination component 124 can determine a transmission policy for user equipment devices of a network that can communicate with network resources that have been allocated, by resource allocation component 126, as active during a given time period. In another aspect, transmission coordination component 124 can determine transmission policies for each cell of a network such that each user equipment device connect to (in communication with) the cell applies the transmission policy of the cell. It is noted that the transmission policies can be applied to the user equipment devices of the network. It is further noted that transmission coordination component 124 can apply different policies for different user equipment devices. The policies can be determined simultaneously, near-simultaneously, or at different times. In an aspect, the transmission coordination component 124 can assign policies to the user equipment devices based on a time slot, a sub-carrier assigned to the user equipment device, and the like. In an example, a user equipment device associated with a particular cell can each apply different policies, can apply a common policy, or can apply a number of policies selected from a set of policies.

In an aspect, the transmission coordination component 124 can select policies form a set of transmission policies. The set of transmission policies can comprise pre-defined policies or dynamically determined policies. In an embodiment, the set of policies can comprise a no-coordination policy, a joint-transmission policy, and an interference-coordination policy. While the above policies are referenced to describe the embodiments disclosed herein, it is noted that other policies can be utilized. In embodiments, transmission coordination component 124 can generate instructions and can communicate the instructions to user equipment devices or other network devices. The instructions can comprise data that facilities implementations of transmission policies at a user equipment device or other network device.

In embodiments, the no-coordination policy can comprise a policy that requires a user to be uniquely served by a cell at a specified sub-carrier of the cell. In an aspect, the transmission coordination component 124 can assign a no-coordination policy to a particular user equipment device, a particular cell, a particular sub-carrier, or a particular combination of cell, sub-carrier, and/or user equipment device.

In a joint-transmission policy, the transmission coordination component 124 assigns two or more cells to jointly transmit data to a user equipment device. Each cell can transmit identical data to the user equipment device at the same time, disparate times, or at partially overlapping times. In an aspect, transmission coordination component 124 can determine a sub-carrier of each cell for the joint transmission. For example, transmission coordination component 124 can determine that a user equipment device should receive identical transmissions from each cell over a common sub-carrier.

According to an interference-coordination policy, the transmission coordination component 124 can instruct a cell to switch on/off a particular sub-carrier based on a measured (e.g., by central unit component 112) interference between the cell and a neighboring cell(s). In an aspect, interference avoidance can be supposed to mainly influence cell pairs.

User association component 128 can associate user equipment devices with network devices (cells) based on a selection criterion or selection criteria. Selection criteria can include, for example, location criteria, signal-to-noise ratio (SINR) criteria, interference criteria, and the like. It is noted that user allocation component 128 can apply collaboration allocation policies and received data, such as user data and resource data, to determine associations of user equipment devices to network cells. In an aspect, user association component 128 can issue an instruction to a user equipment device (e.g., through a small cell, through a macro cell, etc.) that instructs the user equipment device to utilize a determine network device for communications. It is noted that the issue of an instruction can be event-based (e.g., triggered in response to determining whether a network resource is allocated to the user equipment device), time based (e.g., based on a period of time), random or pseudo random, or the like. In another aspect, user association component 128 can store a record of user associations with network devices in, for example, a list, a table, and the like.

In an aspect, the coordination component 120 can adaptively organize one or more operating sets of policies, generated by transmission coordination component 124, to serve multiple users at potentially different sub-carriers as associated by user association component 128. The union of the operating sets and associations can be referred to as a collaboration allocation policy. In embodiments, the coordination component 120 determines collaboration allocation policies based on an average of a network energy efficiency metric while ensuring an average of each user equipment throughput meets a threshold fairness rate.

Figure 2:
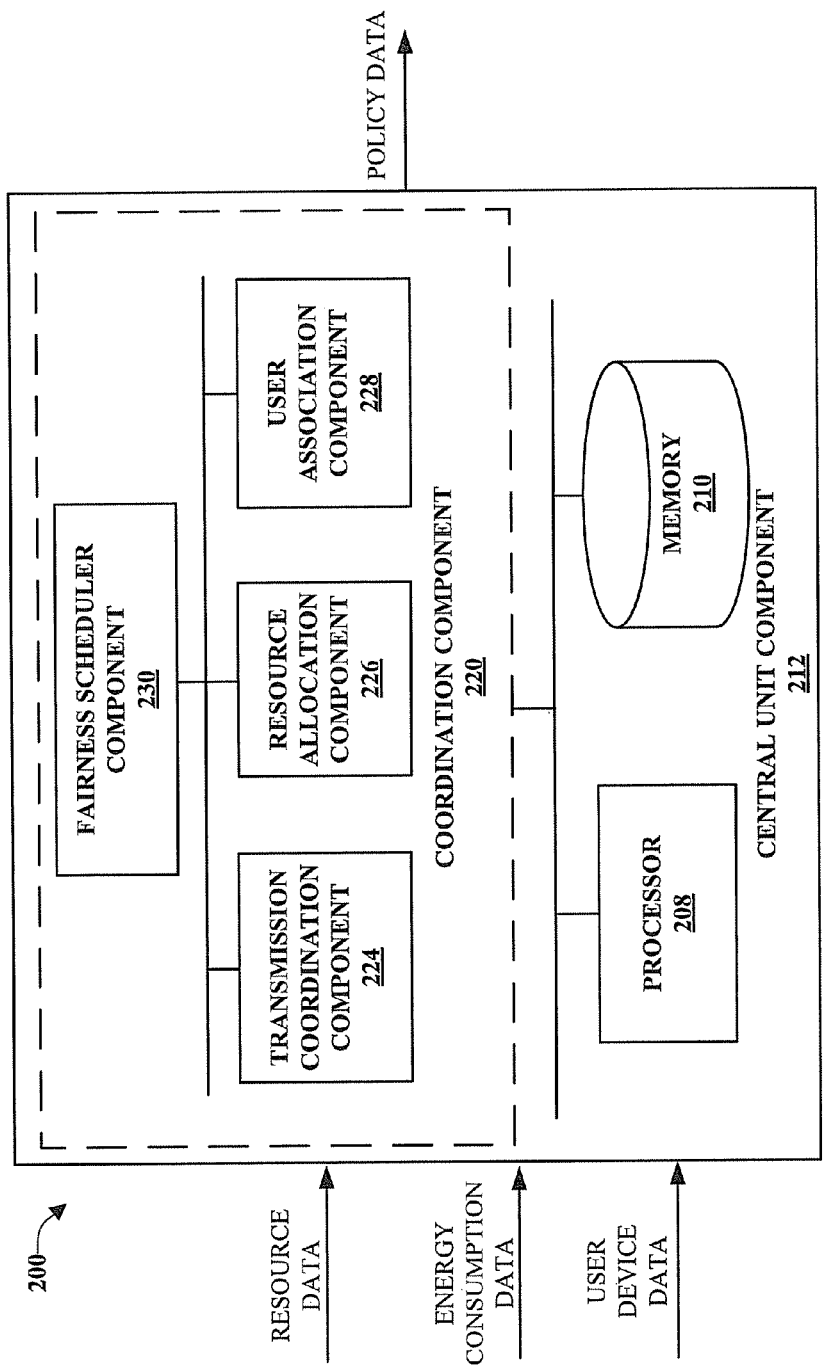
FIG. 2 illustrates an example, non-limiting network system, including a fairness scheduler component, for coordinating transmissions, resources, and user equipment device assignments, according to aspects disclosed herein.

Referring now to FIG. 2, a system 200 is depicted. System 200 can coordinate network transmissions, network resources, and user equipment device assignments according to a fairness policy. Embodiments disclosed herein, for example, generate collaboration allocation sets to achieve an energy efficiency threshold and throughput fairness threshold according to a fairness policy Improving energy efficiency while maintaining a throughput fairness can maintain and/or increase a quality of service experienced by users while providing environmental and economic benefits. System 200 can include a central unit component 212. The central unit component 212 can include a memory 210 that stores computer executable components and a processor 208 that executes computer executable components stored in the memory 210. It is to be appreciated that the system 200 can be used in connection with implementing one or more of the systems or components shown and described in connection with other figures disclosed herein. It is noted that all or some aspects of system 200 can be comprised in larger systems such as servers, computing devices, base stations, and the like.

In an embodiment, central unit component 212 can include communicably coupled components such as coordination component 220. In an aspect, coordination component 220 can facilitate creation of collaboration allocation sets according to a fairness policy. Coordination component 220 can comprise a transmission coordination component 224 (which can coordinate transmissions to user equipment devices), a resource allocation component 226 (which can determine network resources to be allocated), a user allocation component 228 (which can associate a user equipment device with a network device and/or sub-carrier), and a fairness scheduler component 230 (which can schedule users on available resources). It is noted that, unless otherwise stated or context suggests otherwise, the various components of system 200 can comprise similar functionality as the components of system 100.

Fairness scheduler component 230 can schedule a set of detected users (e.g., users within a coverage of a network) on available resources that the resource allocation component 226 has allocated or scheduled a set of users based on its channel conditions regarding to network resources. In another aspect, fairness scheduler component 230 can verify achievement of a fairness threshold. For example, the fairness scheduler component 230 can determine a maximum sum of a logarithmic average of user equipment device throughput while maintaining user fairness. In another aspect, the fairness scheduler component 230 can utilize a heuristic proportional fairness scheduling algorithm to achieve global provisioning of resources.

Figure 3:
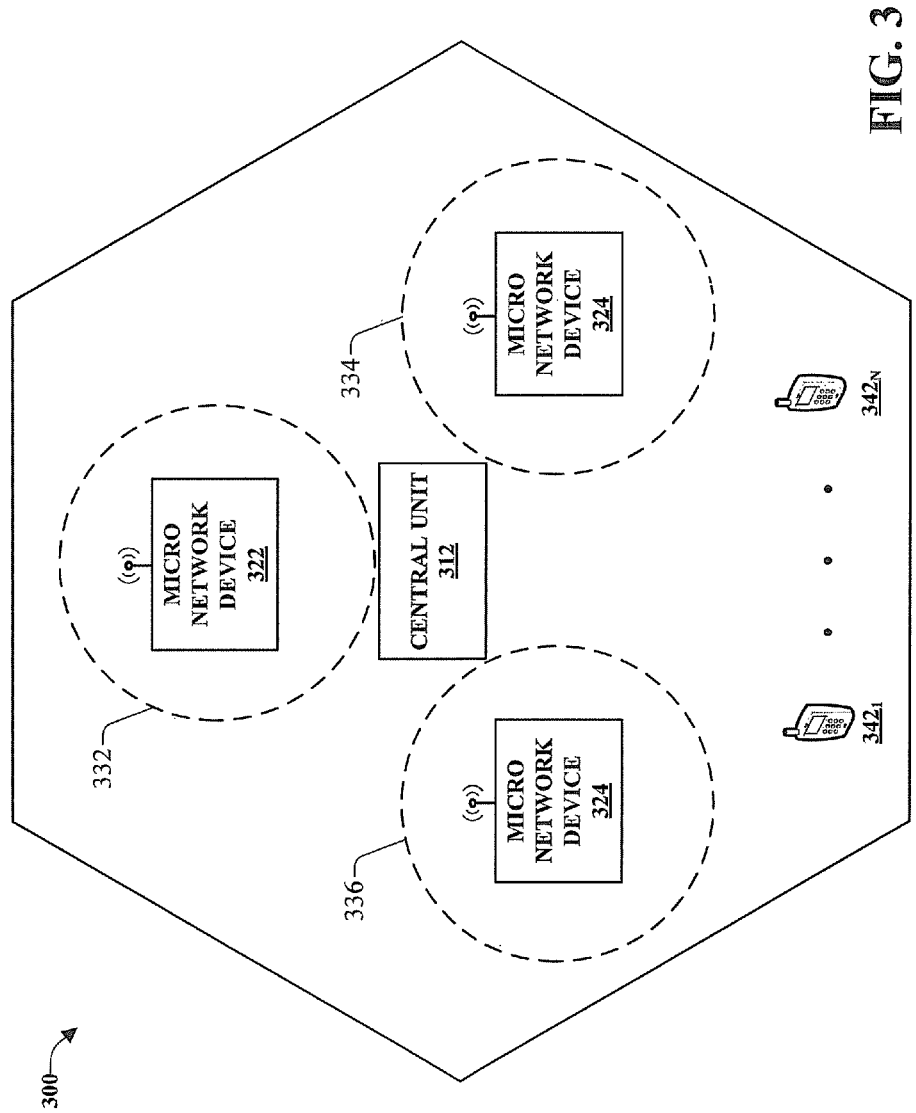
FIG. 3 illustrates an example, non-limiting network environment, including three micro network devices, for coordinating network recourses based on a fairness metric and an energy efficiency metric, according to aspects disclosed herein.

With reference to FIG. 3, illustrated is an example, non-limiting communication network system 300 for coordinating communications in a Cloud-RAN network, according to aspects described. System 300 can be include a central unit 312 (e.g., central unit component 112, central unit component 212, etc.) in communication with micro network devices 322, 324, and 326. Each user equipment devices $342_1$-$342_N$ can be in communication with one or more micro network devices 322, 324, and 326. It is noted that central unit 312 can be comprised in a network device (e.g., base station) that has a coverage area and micro network devices 322, 324, and 326 can comprise small cells (each having a coverage area) of a Cloud-RAN network. It is noted that system 300 can comprise different numbers of micro network devices, base stations, and user equipment devices.

The network system 300 can operate to implement techniques for a heterogeneous network environment that provide automatic transmission coordination, for example. The central unit 312 can operate as a network device that can facilitate transmission coordination operations to configure neighbor relations such that transmissions can be performed in combination with neighbor relation establishment without dropping below a fairness threshold and/or energy efficiency metric.

As illustrated, each of the one or more micro network devices 322, 324, and 326 can have a corresponding service area 332, 334, and 336. However, the network system 300 is not limited to this implementation and various other architectures can also be employed. For example, the network devices of the network system 300 could deploy any number of Wi-Fi access points and respective service areas within the network system 300.

Each user equipment devices $342_1$-$342_N$ can comprise some or all of the functionality of a system, subscriber unit, subscriber station, mobile station, mobile, wireless terminal, device, user equipment device, remote station, remote terminal, access terminal, user terminal, terminal, wireless communication device, wireless communication apparatus, user agent, user device, and the like, for example. User equipment devices $342_1$-$342_N$ can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. Each user equipment devices $342_1$-$342_N$ can be served by the one or more micro network devices 322, 324, and 326, or the central unit 312. In an aspect, handovers can be controlled by a network data, data store, a data set, a data list, neighbor relation table (NRT), or the like that is managed or maintained by central unit 312, a macro network device, a micro network device or the other network device, for example, or each mobile device itself. User equipment devices $342_1$-$342_N$ can respectively broadcast an identifying signature or waveform, which can be an identification or fingerprint that the network devices store from the user equipment devices as a time and frequency reference, as well as for identification. Each waveform can be enumerated by the Physical Cell Identity (PCI). The network devices of the network system 300 can communicate broadcasts with user equipment devices $342_1$-$342_N$ comprising a globally unique cell identifier (CGI) or a public land mobile network (PLMN) identifier as well and the network devices of the network system 300 can utilize mobile device neighbor relation functions, in which mobile devices can decode and report CGI information of neighbor cells to the serving cell upon request.

For example, a network device such as central unit 312 can maintain network data for each cell. The entries or candidates of the network data can comprise data that the network device utilizes about neighboring networks and network devices. Central unit 312, for example, can have a complete knowledge of other network devices, such as micro network devices 322, 324, and 326. Micro network devices 322, 324, and 326 can have a complete knowledge, an incomplete knowledge, or not be aware of all neighbors depending upon inaccuracies in signal propagation, maps data, if a network has been newly installed, or the like.

In an example scenario, micro network devices 322, 324, and 326 can serve user equipment devices $342_1$-$342_N$ according to a collaboration agreement policy. The collaboration agreement policy can comprise one or more operating sets of transmissions policies, sets of allocated resources, and/or sets of user associations. Micro network devices 322, 324, and 326 can apply the collaboration agreement policy to facilitate communications and to manage network energy efficiency and user fairness.

Turning back to FIG. 2 with reference to FIG. 3, each base station device micro network devices 322, 324, 326 and/or a base station device of central unit 312 can be denoted as a set of M network devices, where M={m|m=0, 1, . . . , M−1}. Where the value of M is a number of base stations and $m_0$ is a base station that comprises central unit 312. Each network device m has a set of sub-carriers K, which is indexed as K={k|k=1, 2, . . . , K} and each sub-carrier (k) has a bandwidth B. A sub-carrier transmitting power of $m_0$ can be denoted as $P_t$. A sub-carrier transmitting power of each micro network devices 322, 324, and 326 can be denoted as $\tilde{P}_t$. User equipment devices that are served by the set of network devices (M), such as user equipment devices $342_1$-$342_N$, can be denoted as a set N that is indexed as N={n|n=1, 2, . . . , N}, where a value of N is the number of served user equipment devices. Channel gain between user n served by network device m on sub-carrier k at time t can be denoted as $G_{n,m,k}(t)$.

In embodiments, the central unit component 212 can assume a universal frequency reuse (e.g., co-channel deployment among M cells). In some embodiments, the central unit component 212 can decide utilization for sub-carriers of micro network devices 322, 324, and 326. In embodiments, central unit component 212 can receive data describing energy use of each sub-carrier and/or can assume universally equivalent power consumptions for each active sub-carrier. For example, resource allocation component 226 can determine utilization of sub-carriers. It is noted that resource allocation component 226 can adjust allocations per time slot. In an aspect, utilization of a sub-carrier k by network device m at time t, can be denoted as $X_{m,k}(t)$, where $x_{m,k}(t)=0$ denotes that sub-carrier k by network device m at time is not active and $x_{m,k}(t)=1$ denotes that sub-carrier k by network device m at time t is active.

In some embodiments, the central unit component 212 can determine utilization of transmission policies. For example, transmission coordination component 224 can determine transmission policies for user equipment devices 332, 334, and 336. In an aspect, $C_i$ can denote an involved cell utilizing a transmission policy i. In another aspect, $C_i$:{m}&$X_{m,k}(t)=1$ can indicate a user device is served by sub-carrier k of network device m at time t utilizing a non-coordination policy. Further, utilization of a joint-transmission policy by a user device can be represented as $C_i$:{m,m'|m,m'∈M,m≠m'}&$X_{m,k}(t)=X_{m',k}(t)=1$. In another aspect, utilization of an interference-coordination policy by a user device can be represented as $C_i$:{m,m'|m,m'∈M, m≠m'}&$X_{m,k}(t)=X_{m',k}(t)=0$.

The activity of $C_i$ can be denoted as $Y_{n,k}^{(C_i)}$, where $Y_{n,k}^{(C_i)}=1$ indicates the policy is activated for user n at sub-carrier k. The central unit component 212 can adaptively organize an operating set of policies to serve user equipment devices at different sub-carriers. The notion $\Re(k,t)=\{C_1, C_2, \ldots C_{|\Re(k,t)|}\}$ can denote the operating set of sub-carrier k at time t and $|\Re(k,t)|$ is the cardinality of the set. The union of the operating sets, as above, can be referred to as a collaboration allocation policy.

In some embodiments, user association component 228 can instruct a user equipment device (n) to communicate (e.g., associate) with a service network device (m) based on selecting criteria, such as SINR based selecting criteria. Macro base station can be associated to follow the central unit component 212's instructions and scheduling controls and user equipment devices can communicate with cells immediately and/or with a delay. In an aspect, no inter-Macro base station interference can be assumed. In another aspect, inter-macro base station interference can be determined and can be provisioned for. Assuming no inter-Macro interference, the central unit component 212 can determine SINR of user n on sub-carrier k at time t which can be denoted as:

$$SINR_{n,k}(t) = \frac{\sum_{i=1}^{|\Re(k,t)|} Y_{n,k}^{(c_i)} \sum_{m \in C_1} (X_{m,k}(t) P_t G_{n,m,k}(t))}{N_0 + \sum_{i=1}^{|\Re(k,t)|} Y_{n,k}^{(c_i)} \sum_{m' \in M - \{C_1\}} (X_{m',k}(t) P_t G_{n,m',k}(t))} \quad (1.1)$$

$$P_t = \begin{cases} P_t & \text{if } m = 0. \\ \tilde{P}_t & \text{otherwise.} \end{cases}$$

where $N_0$ is additive white Gaussian noise. In another aspect, central unit component 212 can determine throughput for a user equipment device n at time t, which can be denoted as:

$$r(n, t) = \sum_{k=1}^{K} B \times \log(1 + SINR_{n,k}(t)) \quad (1.2)$$

In another aspect, central unit component 212 can determine a power consumption of a base station (e.g., of central unit 312). In an aspect, a linear power consumption of a base station can be denoted as:

$$P_0(t) = \sum_{k=1}^{K} X_{0,k}(t) P_t + P_C \quad (1.3)$$

$$P_m(t) = \sum_{k=1}^{K} X_{m,k}(t) \tilde{P}_t + \tilde{P}_C, m \neq 0$$

where $P_C$ accounts for static circuit power of a macro base station (e.g., of central unit 312) and $\tilde{P}_C$ accounts for static circuit power of a micro network device (e.g., small cell). In another aspect, $P_0$ can represent a total power consumption of macro base station (e.g., of central unit 312) and $P_m$ represents a total power consumption of a small cell.

Central unit component 212 can determine a network energy efficiency (e.g., of system 300). In some embodiments, the central unit component 212 can determine the network energy efficiency based on a total cell power consumption and a system throughput. For example, central unit component 212 can determine the energy efficiency, denoted as $\eta_{EE}(t)$ as a ratio of system throughput to total cell power consumption (e.g., Mbps/Joule) as follows:

$$\eta_{EE}(t) = \frac{R(t)}{P(t)} = \frac{\sum_{n=1}^{N} r(n, t)}{P_0(t) + \sum_{m=1}^{M} P_m(t)} \quad (1.4)$$

Fairness scheduler component 230 can schedule users on available resources based on improving an average of network energy efficiency, denoted as $\overline{\eta_{EE}}(t)$ and ensuring each user equipment device n, such as user equipment devices 332, 334, and 336, has an average throughput that exceeds a rate threshold, which can be denoted as γ. In an aspect, fairness scheduler component 230 can schedule a user based on altering operating parameters $X_{m,k}, Y_{n,k}$, and $\Re(k, t)$. For example, fairness scheduler component 230 can alter the operating parameters of a global optimization in equation 1.5:

$$\max_{\{X_{m,k}, Y_{n,k}^{(C_i)}, \Re(k,t)\}} \overline{\eta_{EE}(t)} \text{ s.t.} \quad (1.5)$$

$$\forall n \in N, r(n, t) > \gamma$$

$$k \in K, C_i \in \Re(k, t), \sum_{n=1}^{N} Y_{n,k}^{(C_i)} \leq 1$$

$$n \in N, k \in K, \sum_{i=1}^{|\Re(k,t)|} Y_{n,k}^{(C_i)} \leq 1$$

$$C_i, C_j \in \Re(k, t), i \neq j, C_i \cap C_j = \phi$$

In another aspect, fairness scheduler component 230 can dynamically implement collaboration agreements generated by the coordination component 220. Coordination component 220 can determine policy energy efficiency, denoted as $$\eta_{EE}^{(Y_{n,k}^{(C_i)})}(t)$$

as the ratio of user rate r (n, t) to the summarized power consumption of policy $C_i$. It is noted that the relationship between network energy efficiency and policy energy efficiency could be derived as below:

$$\eta_{EE}(t) = \frac{\sum_{n=1}^{N} r(n, t)}{P_0(t) + \sum_{m=1}^{M-1} P_m(t)} \quad (1.6)$$

$$= \frac{\sum_{n=1}^{N} r(n, t)}{\sum_{k=1}^{K} X_{0,k}(t) P_t + P_c + \sum_{m=1}^{M-1} \left( \sum_{k=1}^{K} X_{m,k}(t) \tilde{P}_t + \tilde{P}_c \right)}$$

$$= \frac{\sum_{n=1}^{N} \sum_{k=1}^{K} B \times \log(1 + SINR_{n,k}(t))}{\sum_{k=1}^{K} \left( X_{0,k}(t) P_t + \sum_{m=1}^{M-1} X_{m,k}(t) \tilde{P}_t \right) +}$$

$$P_c + (M - 1) \times \tilde{P}_c$$

$$\leq \sum_{k=1}^{K} \left( \frac{\sum_{n=1}^{N} B \times \log(1 + SINR_{n,k}(t))}{X_{0,k}(t)P_t + \sum_{m=1}^{M-1} X_{m,k}(t)P_t} \right)$$

$$\leq \sum_{k=1}^{K} \sum_{n=1}^{N} \sum_{i=1}^{|\Re(k,t)|} \eta_{EE}^{\left(Y_{n,k}^{(C_i)}\right)}(t).$$

In another aspect, fairness scheduler component 230 can increase (e.g., maximize) the sum of logarithmic average efficiency while guaranteeing average user throughput by deciding an appropriate collaboration agreement policies and appropriate user selection. For example, fairness scheduler component 230 can utilize equations 1.5 and 1.6.

In some embodiments, the fairness scheduler component 230 can utilize a particular collaboration agreement policy denoted as (t)={$\Re(1, t), \Re(2, t) \ldots \Re(K, t)$} and a number of available resources denoted as $$\sum_{k=1}^{K} |\Re(k, t)|$$

to determine users according to:

$$P = \operatorname{argmax}_S \prod_{n \in N_S} \left( 1 + \frac{\sum_{k=1}^{K} \sum_{i=1}^{|\Re(k,t)|} Y_{n,k}^{(C_i)} \eta_{EE}^{\left(Y_{n,k}^{(C_i)}\right)}(t)}{\left(T - \sum_{k=1}^{K} \sum_{i=1}^{|\Re(k,t)|} Y_{n,k}^{(C_i)} \eta_{EE}^{\left(Y_{n,k}^{(C_i)}\right)}(t)\right)} \right) \quad (1.7)$$

where $N_S$ is the set of selected users by scheduler component 230 (denoted as S), T denotes an average window size, and $$\eta_{EE}^{\left(Y_{n,k}^{(C_i)}\right)}(t)$$

is the average policy energy efficiency at time t. The average network energy efficiency and average user throughput under (t) with scheduler component 230 were denoted by $\overline{\eta_{EE}}^{(s,)}(t)$, $\overline{r^{(s,)}}(n,t)$, respectively.

In an embodiment, coordination component 220 can determine an appropriate collaboration agreement policy based on a collaboration agreement policy generation process. In one aspect, coordination component 220 can utilize a genetic selection algorithm, a policy replacement algorithm, an optimization algorithm, an artificial intelligence algorithm (e.g., hidden Markov model), a linear programming algorithm or the like. It is noted that coordination component 220 can utilize one or more algorithms to generate a collaboration agreement policy. For example, coordination component 220 can utilize both a genetic selection algorithm and a policy replacement algorithm, and can then select a policy generated by one of the algorithms.

In some embodiments, the genetic algorithm can comprise generating generational sets of collaboration allocation policies. Coordination component 220 can select a set of collaboration agreement policies from an initial generational set and can breed (e.g., selected for generating later sets) the selected collaboration agreement policies. A fitness function $$f((t)) = \min_{n \in N} \overline{r^{(s,)}}(n, t) - \gamma \geq 0$$

can be passed to the next generation while the selected collaboration agreement policy can be selected based on an associated efficiency $\eta^{(s,)}(t)$ being above a determent threshold (e.g., highest 50% of present generation). Operating sets of the selected set of collaboration agreement policies can be crossed (e.g., combined) to produce a successive generation. It is noted that the selection and breeding can be continued until a fixed number of generations is reach, an energy efficiency is reached, and/or a fairness metric is reached. In an aspect, collaboration agreement policy can be selected from the final generation. In another aspect, the coordination component 220 can store a list of best collaboration agreement policies from each generation, and a final collaboration agreement policy can be selected from the list (e.g., having the best energy efficiency while maintaining a fairness metric).

In another embodiment, coordination component 220 can utilize a policy replacement algorithm to generate collaboration agreement policies. The policy replacement algorithm can generate an initial collaboration agreement policy, (t). The policy replacement algorithm can select transmission polices for replacement based on selection and replacement criteria. In an aspect, coordination component 220 can continue to generate policies until a final policy is generated, wherein the final policy meets a threshold fairness metric and the energy efficiency meets an energy efficiency threshold (e.g., until improvement no longer occurs).

In some embodiments, utilization of an interference-coordination policy can increase a network energy efficiency but can also result in a negative impact to user fairness, according to equations 1.6 and 1.7. In other embodiments, utilization of a joint-transmission policy can improve a coverage of system 300 but can result in a negative impact to a network energy efficiency, according to equations 1.6 and 1.7. In another aspect, utilization of a no-coordination policy can result in decrease energy efficiency in respect to a joint-transmission policy and an interference-coordination policy. Accordingly, coordination component 220 can utilize the policy replacement algorithm to generate an operating set of a collaboration agreement policy by appropriately replacing various no-coordination policies, joint-transmission policies, and interference-coordination policies based on a desired outcome (e.g., increase throughput, decrease energy consumption, etc.).

As an example, coordination component 220 selects a set of transmission policies for user equipment devices based on a performance metric representing energy consumption of the network and the throughput data representing the respective throughputs associated with the user equipment devices. Coordination component 220 can determine to replace a transmission policy based on respective throughputs of the user equipment devices satisfying a defined fairness threshold. In an aspect, if the fairness threshold is satisfied, coordination component 220 can alter transmission policies until the defined fairness threshold is no longer satisfied.

In an embodiment, coordination component 220 can determine if all average user throughputs satisfy a fairness threshold (e.g., throughput of all N satisfies a throughput threshold $\gamma$). In response, network resources can be turned off to reduce energy (e.g., an interference-coordination policy can replace no-coordination policies and/or joint-transmission policies). For example, sub-carriers of particular small cells can be de-activated. In an aspect, the coordination component 220 (e.g., via resource allocation component 226) can determine to switch off a sub-carrier k of small cell m based on equation 1.8:

$$\text{let } X_{m,k}(t) = 0 \mid C_i : \{X_{m,k}(t) = 1\}, \quad (1.8)$$
$$i = \arg\min_{C_i \in (t), n \in N, k \in K} \eta_{EE}^{\left(\gamma_{n,k}^{(C_i)}\right)}.$$

Resource allocation component 226 can instruct cell m to de-allocate carrier k. The coordination component 220 can update a coordination agreement policy based on carrier k of small cell m being de-allocated. For example, the coordination agreement policy can be updated such as in equation 1.9:

$$(t) = (t) - \{C_i : \{X_{m,k}(t) = 1\}\} - \quad (1.9)$$
$$\{C_j : \{X_{m',k}(t) = 1\}\} + \{C_i^* : \{X_{m',k}(t) = 1, X_{m,k}(t) = 0\}\}$$

where $$C_j : \{X_{m',k}(t) = 1\} = \arg\min_{C_j \in (t) - \{C_i\}, n \in N, k \in K} \eta_{EE}^{\left(\gamma_{n,k}^{C_j}\right)}.$$

Coordination component 220 can continue to replace transmission policies as in equation 1.8 and can continue to update coordination agreement policies as in equation 1.9. In an aspect, coordination component 220 can continue the replacing and updating until a throughput of a user equipment device reaches a minimum throughput threshold and a network energy efficiency is greater than a network energy efficiency threshold (e.g., an energy efficiency of a past coordination agreement policy). For example, the replacement and updating can be continued until equation 1.10 cannot be held.

$$\overline{\eta_{EE}^{(S_s)}(t)} > \overline{\eta_{EE}^{(S_s)}(t)} \ \& \min_{n \in N} \overline{r^{(S_s)}(n,t)} \geq \gamma \quad (1.10)$$

In another aspect, coordination component 220 can determine that not all average user throughputs satisfy a threshold (e.g., throughput of any n of N satisfies a throughput threshold γ). Thus, network resources can be turned on to increase user throughput (e.g., joint-transmission policies can replace no-coordination policies and/or interference-coordination policies). For example, sub-carriers of particular small cells can be activated based on implementing a joint-transmission policy on a previously de-activated sub-carrier. In an aspect, the coordination component 220 (e.g., via resource allocation component 226) can determine to switch on a sub-carrier k of small cell m.

Coordination component 220 can select cells m and m' to form a joint-transmission pair on sub-carrier k based on an energy efficiency and user throughput. For example, the pair of m and m' can be selected based on:

$$m \mid C_i : \{X_{m,k}(t) = 1\}, i = \arg\min_{C_i \in (t), n \in N, k \in K} \left[\eta_{EE}^{\left(\gamma_{n,k}^{(C_i)}\right)}\right] \quad (1.11)$$

-continued $$m' \mid C_j : \{X_{m',k}(t) = 1\}, j = \arg\min_{C_j \in (t) - \{C_i\}, n \in N, k \in K} \left[\eta_{EE}^{\left(\gamma_{n,k}^{(C_j)}\right)}\right]$$

In another aspect, coordination component 220 can update a coordination agreement policy based on carrier k of small cell m and m' being allocated. For example, the coordination agreement policy can be updated such as in equation 1.12:

$$(t) = (t) - \{C_i : \{X_{m,k}(t) = 1\}\} - \{C_j : \{X_{m',k}(t) = 1\}\} + \{C_i^* : \{X_{m,k}(t) = 1, X_{m',k}(t) = 1\}\}. \quad (1.12)$$

Coordination component 220 can continue to replace transmission policies as in equation 1.11 and can continue to update coordination agreement policies as in equation 1.12. In an aspect, coordination component 220 can continue the replacing and updating until a fairness throughput is satisfied for all user equipment devices. For example, the replacement and updating can be continued until equation 1.10 is held.

Coordination component 220 can continue the replacing and updating until no update could be executed. For example, until energy efficiency is no longer improved by replacement without holding equation 1.10. In an aspect, coordination component 220 can monitor past collaboration agreement policies and can determine if policies become repeated. In another aspect, coordination component 220 can select a collaboration agreement policy from the past collaboration agreement policies and/or select the last updated collaboration agreement policy. It is noted that a collaboration agreement policy can be selected for each time slot. Accordingly, an appropriate set of collaboration agreement policies can be determined.

Figure 4:
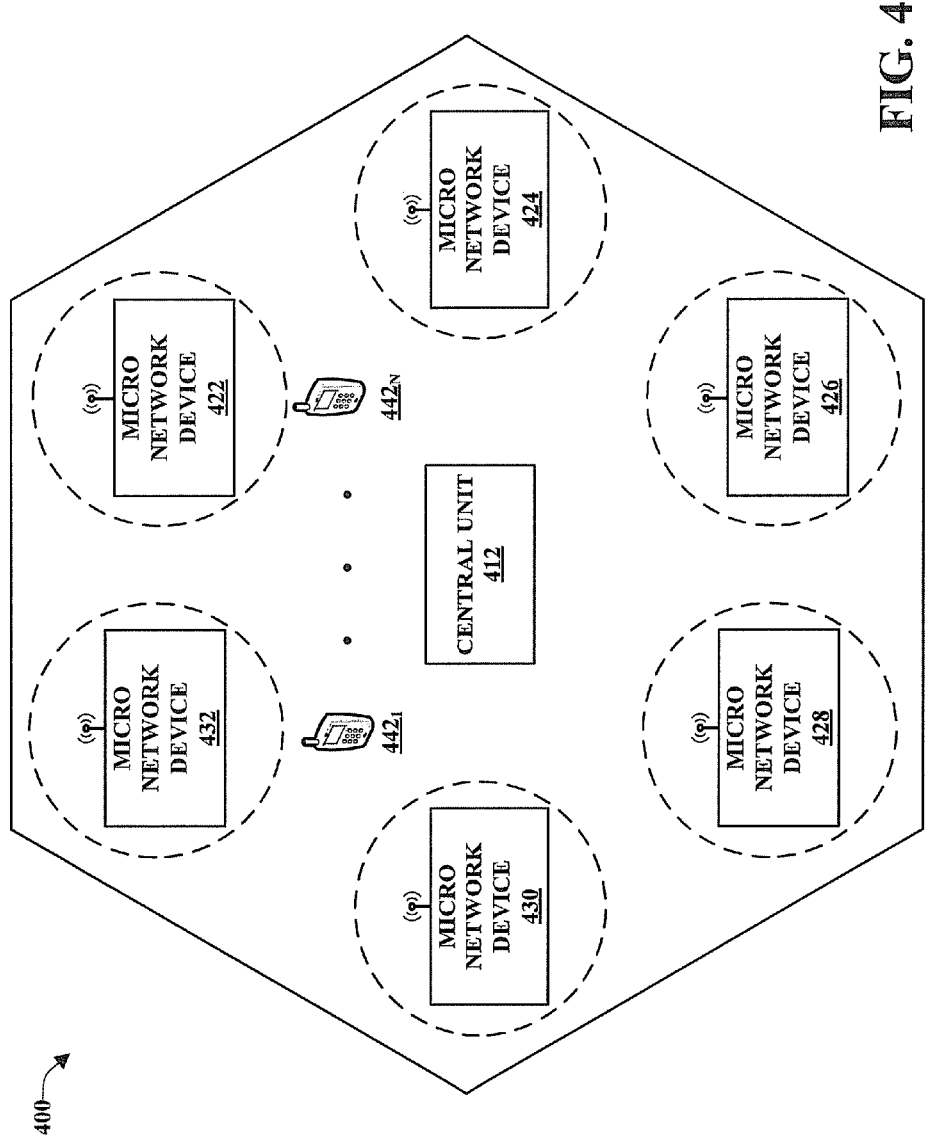
FIG. 4 illustrates an example, non-limiting network environment, including six micro network devices, for coordinating network recourses based on a fairness metric and an energy efficiency metric, according to aspects disclosed herein.
Figure 5:
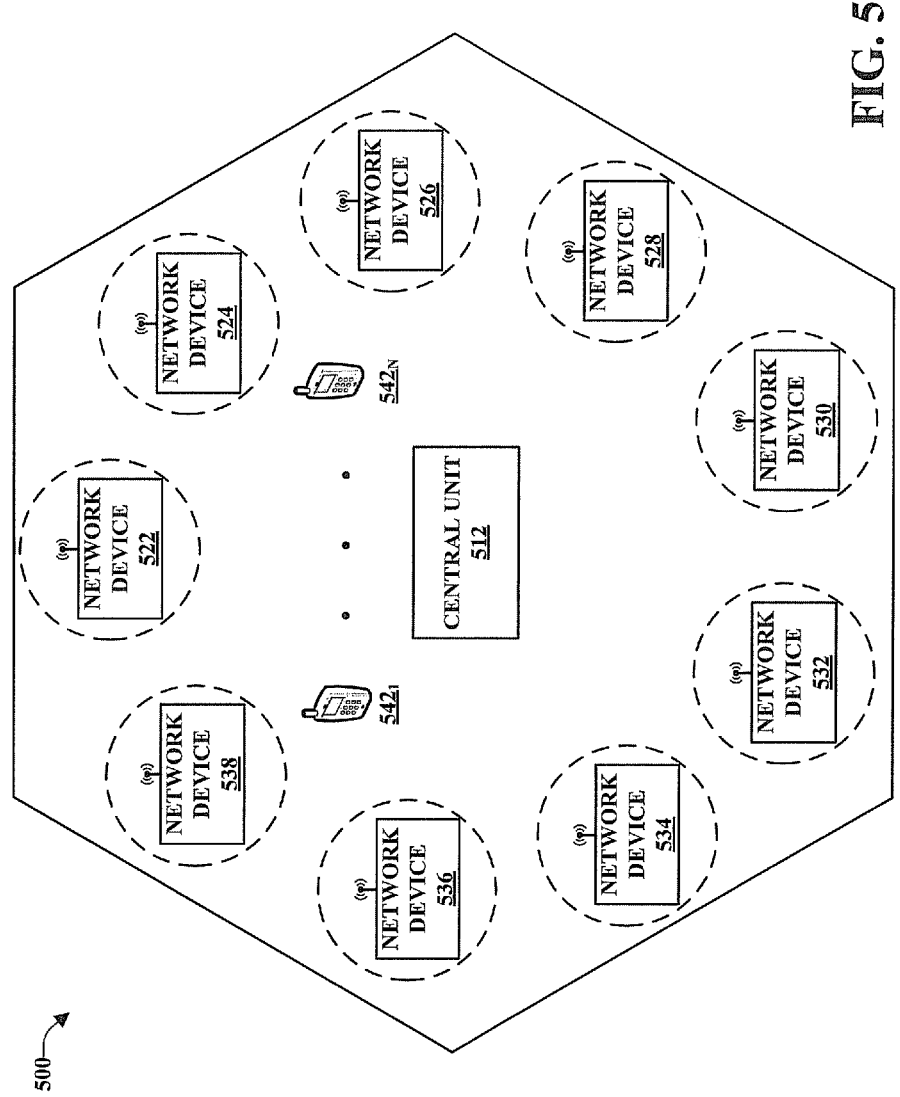
FIG. 5 illustrates an example, non-limiting network environment, including nine micro network devices, for coordinating network recourses a based on a fairness metric and an energy efficiency metric, according to aspects disclosed herein.

Referring now to FIGS. 3-5, illustrated are systems 300, 400, and 500. The systems 300, 400, and 500 each represent an example communications network comprising a central unit (base station) and a number of a number of hexagonally deployed network devices (e.g., small cells). Simulations are described with references to systems 300, 400, and 500. It is noted that simulations comprised deploying network devices 500 meters from a base station device, 60 user equipment devices served by each system 300, 400, and 500, and each user moved at 3 kilometers per hour. Additionally, simulations were conducted with the following parameters: a bandwidth (B) of 10 megahertz (MHz) on 50 sub-carriers; power consumptions were respectively set at $P_r$:29, $P_c$:55, $P_t$:13, $P_f$:8, $P_c$:38 decibels per milliwatt (dBm); user throughput threshold (γ) was set at three (3) megabits per second (MBps); channel mode was configured for third Generation Partnership Project Error Vector Magnitude (3 GPP EVM); and the traffic mode was set as a full buffer traffic mode.

As depicted, system 300 comprises three network devices 322, 324, and 326. System 400 can comprise central unit 412 and six network devices, namely network devices 422, 424, 426, 428, 430, and 432. System 500 can comprise central unit 512 and nine network devices, namely network devices 522, 524, 526, 528, 530, 532, 534, 536, and 538. Simulations were conducted utilizing various coordination agreement policies. In an aspect, simulations included coordination agreement policies generated according to a genetic selection process, coordination agreement policies generated according to a policy replacement process, a coordination agreement policy utilizing only a no-coordination policy, a coordination agreement policy utilizing only a fixed joint transmission policy (e.g., no replacement and/or genetic selection), and a coordination agreement policy utilizing only a fixed interference-coordination policy (e.g., no replacement and/or genetic selection). It is noted that each system 300, 400, and 500 can comprise one or more user equipment devices in communication with network devices.

Figure 6:
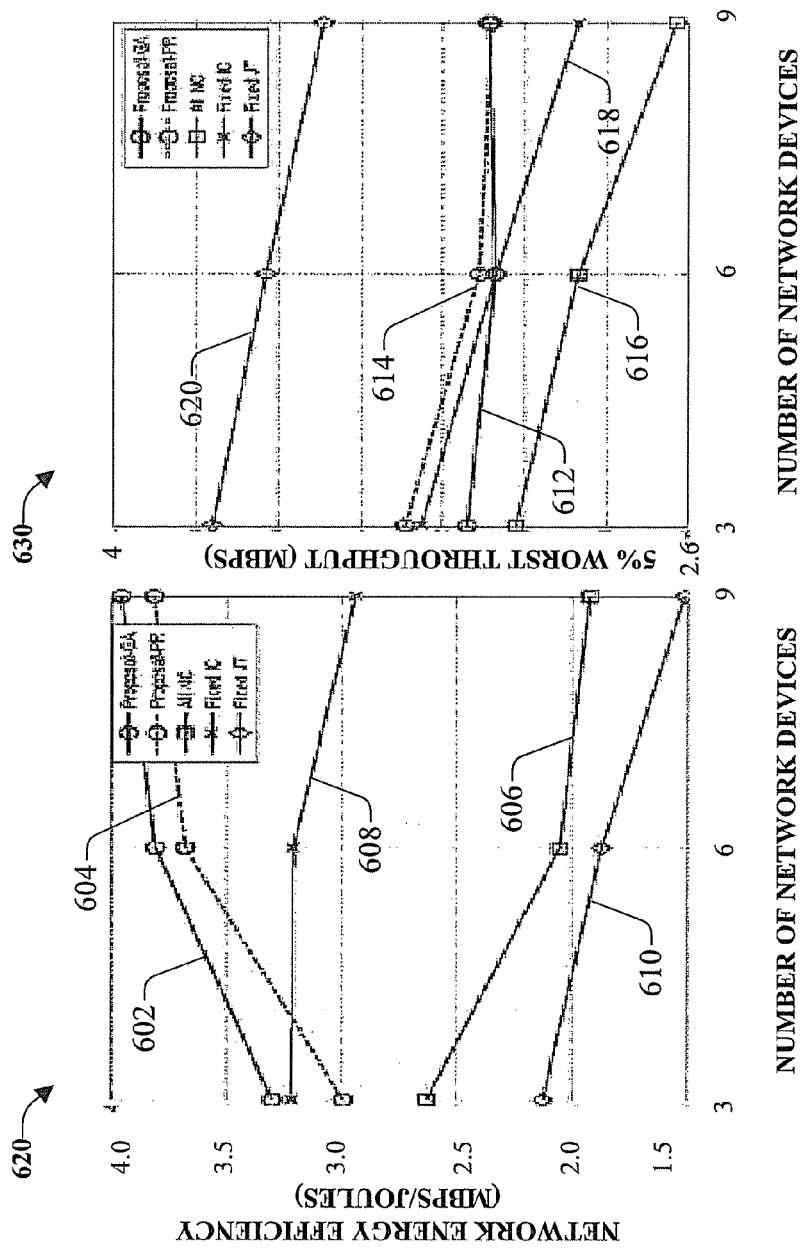
FIG. 6 illustrates a graph of a network efficiency and a graph of user throughput, according to aspects disclosed herein.

Turning to FIG. 6, with reference to FIGS. 3-5, there illustrated are graph 620 and graph 630. Graph 620 illustrates a network energy efficiency of systems utilizing various coordination agreement policies. Graph 630 depicts a performance metric of representing user fairness for systems utilizing various coordination agreement policies.

In an aspect, graph 620 illustrates network energy efficiency (Mbps/joule) verses a number of network devices. Results of various cooperation agreement policies on systems 300, 400, and 500 are depicted. A genetic selection process result is illustrated as 602, a policy replacement process result is illustrated as 604, a no-coordination policy result is illustrated as 606, a fixed interference-coordination policy result is illustrated as 608, and a fixed joint transmission policy result is illustrated as 610.

Graph 630 illustrates average throughput for the bottom five percent of users (e.g., users with lowest throughput) verses the number of network devices. Results of various cooperation agreement policies on systems 300, 400, and 500 are depicted. A genetic selection process result is illustrated as 612, a policy replacement process result is illustrated as 614, a no-coordination policy result is illustrated as 616, a fixed interference-coordination policy result is illustrated as 618, and a fixed joint transmission policy result is illustrated as 622.

As depicted, graphs 620 and 630 indicated that a genetic selection process and a policy replacement process result in increased network energy efficiency while maintaining user fairness above a threshold level. It is noted that the simulations are but a few examples of benefits of the disclosed embodiments. It is further noted that additional improvements can result based on altering policy generating procedures in accordance with embodiments disclosed herein.

FIGS. 7-10 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. It is noted that a methodology can alternatively be represented as a series of interrelated states or events, such as in a state diagram. Moreover, not all illustrated acts may be required to implement a methodology in accordance with the disclosed subject matter.

Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 7-10 can be performed by various systems disclosed herein, such as systems 100, 200, 300, 400, 500, and 600.

Figure 7:
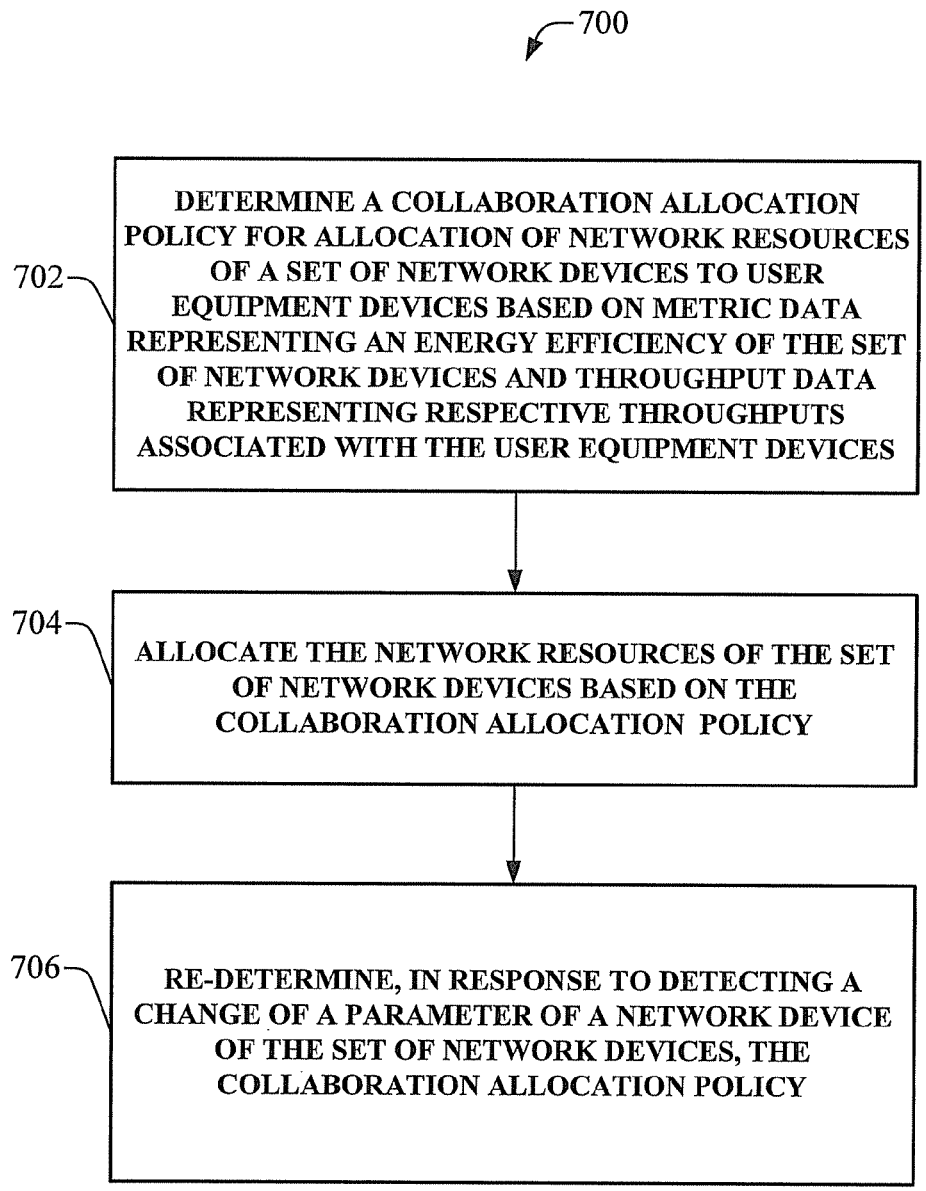
FIG. 7 illustrates an example, non-limiting method, for transmission coordination, according to aspects disclosed herein.

FIG. 7 illustrates an example, non-limiting method 700 for a transmission coordination processor for a mobile device in a wireless network environment. For example, method 700 can comprise a method, implemented by a user equipment device that facilitates communications according to a collaboration agreement policy.

The method 700 can initiate at 702. At reference numeral 702, a system comprising a processor, can determine a collaboration allocation policy for allocation of network resources of a set of network devices to user equipment devices based on metric data representing an energy efficiency of the set of network devices and throughput data representing respective throughputs associated with the user equipment devices. In an aspect, the network device (e.g., a base stations, small cell, etc.) can transmit the instruction via a network.

At 704, a system can allocate the network resources of the set of network devices based on the collaboration allocation policy. For example, a user equipment device comprising a processor, can be assigned a network resource such as a sub-carrier of a network device of a network to utilize for transmissions At 706, a system can re-determine, in response to detecting a change of a parameter of a network device of the set of network devices, the collaboration allocation policy. For example, the collaboration allocation policy can be re-determined based on updated metric data representing an energy efficiency of the set of network devices and throughput data representing respective throughputs associated with the user equipment device.

Figure 8:
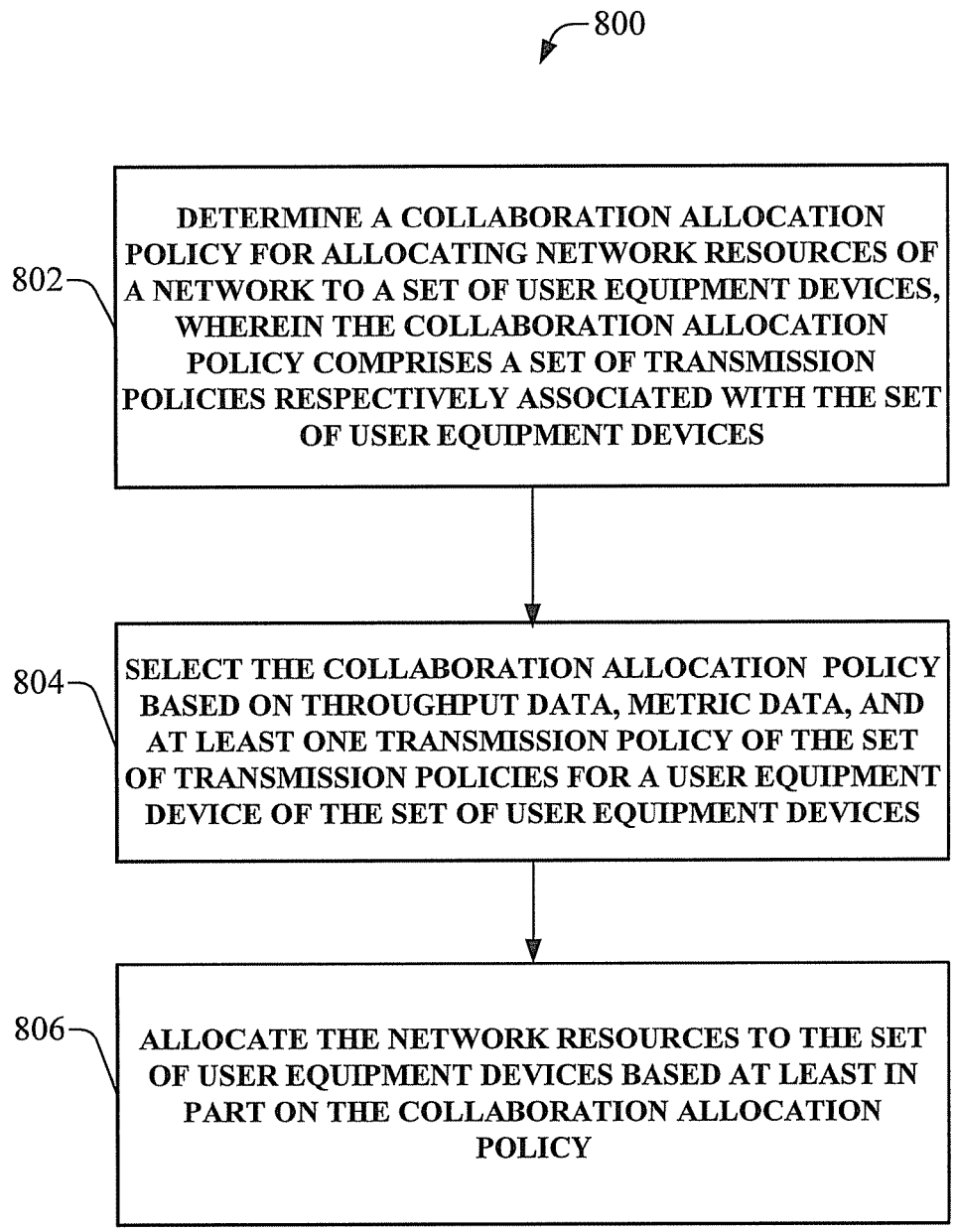
FIG. 8 illustrates an example, non-limiting method, for generating a collaboration allocation policy and implementing the collaboration allocation policy in a wireless network environment, according to aspects disclosed herein.

FIG. 8 illustrates an example, non-limiting method 800 for generating a collaboration allocation policy and implementing the collaboration allocation policy in a wireless network environment, in accordance with various aspects disclosed herein. For example, method 800 can comprise a method, implemented by one or more network devices, to generate and implement a collaboration agreement policy.

The method 800 can initiate at 802. At reference numeral 802, a system comprising a processor, can determine (e.g., via a coordination component) a collaboration allocation policy for allocating network resources of a network to a set of user equipment devices, wherein the collaboration allocation policy comprises a set of transmission policies respectively associated with the set of user equipment devices. In an embodiment, the collaboration allocation policy can comprise a set of transmission policies that can include no-coordination policies, joint-transmission policies, interference-coordination policies, and the like. Determining the collaboration allocation policy can comprise generating a collaboration allocation policy that guarantees an average user throughput at a determined fairness threshold while maintaining a network energy efficiency at a determined threshold. In an aspect, determining the collaboration allocation policy can be based on metric data representing an energy efficiency of a network, a number of served user equipment devices, a number of small cells, throughput data representing respective throughputs associated with user equipment devices that are served by the network, network measurements (e.g., interference, SINR, and the like), channel characteristics, and the like. In an example, the collaboration allocation policy can include instructions to allocate a resource of a network device (e.g., sub-carrier of a small cell) to a user equipment device. In some embodiments, the collaboration allocation policy can comprise instructions that facilitate allocation and/or de-allocation of network resources. While embodiments described herein reference coordinating transmissions between small cells, it is noted that coordination can comprise coordinating between base stations; each base station may/may not have a number of attached small cells.

At 804, a system can select (e.g., via a coordination component) the collaboration allocation policy based on throughput data, metric data, and at least one transmission policy of the set of transmission policies for a user equipment device of the set of user equipment devices. In an aspect, the selection can comprise selecting a user equipment device based on a throughput associated with the user equipment device and/or energy consumption of one or more network devices that service the user equipment devices. For example, a system can determine a user equipment device is below, at, or near a fairness threshold and can determine to select a transmission policy to increase the throughput of the user equipment devices. In another example, a system can determine that a user throughput is above a fairness threshold (e.g., a measured level of throughput above a threshold) and can select a transmission policy to reduce power consumption of network devices servicing the user equipment devices.

It is noted that the system can utilize service agreement data to determine a required throughput of a user equipment device and can select the policy based on the required throughput. It is further noted that a particular user equipment device (or set of user equipment devices) can be associated with a user identity that requires an elevated, with respect to other user entities associated with other user equipment devices, throughput level. For example, a user equipment device can comprise an elevated user throughput level. The system can select a transmission policy that is estimated to meet the elevated user throughput level.

At 806, a system can allocate (e.g., via a resource allocation component) the network resources to the set of user equipment devices based at least in part on the collaboration allocation policy. For example, the system can allocate a previously inactive sub-carrier to a user equipment device. In another example, the system can allocate a previously active sub-carrier to a pool of de-active sub-carriers. It is noted that allocating a network resource can comprise acts of de-allocating (e.g., turning a sub-carrier off). It is further noted that the activation and deactivation of sub-carriers may depend on the transmission policy determined by a transmission coordination component.

For example, a system can, based on a transmission policy, turn off a sub-carrier that is currently involved in a joint-transmission policy. In another example, the system can allocate a sub-carrier to a user equipment device that does not meet a fairness threshold and/or is at or about a fairness threshold.

Figure 9:
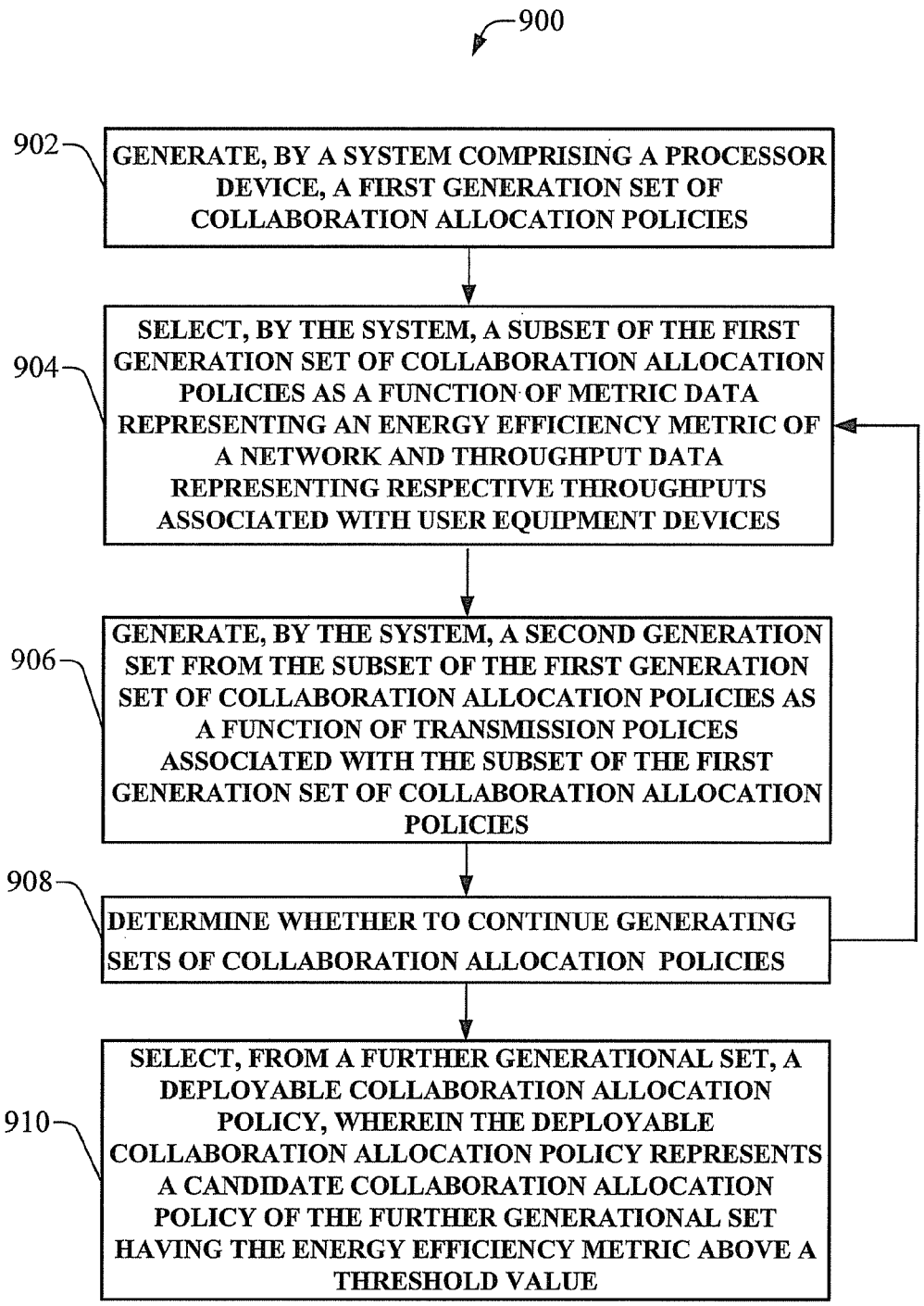
FIG. 9 illustrates an example, non-limiting method, for generating a collaboration allocation policy, based on a genetic selection policy, for a wireless network environment, according to aspects disclosed herein.

FIG. 9 illustrates an example, non-limiting method 900 for generating a collaboration allocation policy, based on a genetic selection policy, for a wireless network environment, in accordance with various aspects disclosed herein. For example, method 900 can comprise a method, implemented by one or more network devices, that facilitates a genetic selection policy for generating a collaboration agreement policy.

The method 900 can initiate at 902. At reference numeral 902, a system comprising a processor, can generate (e.g., via a coordination component) a first generation set of collaboration allocation policies. A first generational set (e.g., initial generation) can be generated at random, selected from a default policy, and/or generated based on an initiating policy. For example, a system can generate an initial generation based on a stored preference (e.g., selecting an equal amount of joint-transmission policies, no-coordination policies, and interference-coordination policies). It is noted that various other initiation policies can be utilized.

At 904, a system can select (e.g., via a coordination component) a subset of the first generation set of collaboration allocation policies as a function of metric data representing an energy efficiency metric of a network and throughput data representing respective throughputs associated with user equipment devices. In an aspect, the system can select the first generation set based on a composite score of energy efficiency and fairness. For example, the system can select the top fifty percent of policies based on a composite score. A composite score can comprise a weighted score based on energy efficiency and user throughput. In another embodiment, the system can select the top fifty percent of energy efficient policies that meet a defined user threshold. It is noted that the system can select more or less than fifty percent of the policies and later generations can be larger in a number of policies and/or smaller in number of policies. It is further noted that various selection techniques can be utilized to achieve aspects disclosed herein.

At 906, a system (e.g., via a coordination component) can generate a second generation set from the subset of the first generation set of collaboration allocation policies as a function of transmission polices associated with the subset of the first generation set of collaboration allocation policies. In an example, "chromosomes" can be selected from parents. Each transmission policy of a current generation can be considered a parent and subsets of their respective transmission policies can be considered chromosomes. Chromosomes are selected and randomly combined to generate a new coordination policy. This process can continue until a full set of coordination policies are generated (e.g., next generational set). In some embodiments, the "fittest" parent and/or set of parents can be past to the next generation. In embodiments, additional constraints can be utilized to select chromosomes at random, semi-random, and/or in an orderly fashion.

At 908, a system can determine (e.g., via a coordination component) whether to continue generating sets of collaboration allocation policies. In an aspect, continuation criteria can comprise a number of generations met, an energy efficiency met, a number of generations without improved energy efficiency and/or under a fairness threshold, and the like. If the continuation criteria are not met, method 900 can continue generating coordination policies at 904. If the continuation criteria are met, method 900 can continue at 910.

At 910, a system can select (e.g., via a coordination component), from a further generational set, a deployable collaboration allocation policy, wherein the deployable collaboration allocation policy represents a candidate collaboration allocation policy of the further generational set having the energy efficiency metric above a threshold value. It is noted that a list of best of a generation set can be kept, and/or a best coordination policy can be kept and compared to each generation. The system can then select the best coordination policy based on a selection metric (e.g., highest efficiency while meeting a minimum fairness, combined weighted score of throughput and energy efficiency, etc.).

Figure 10:
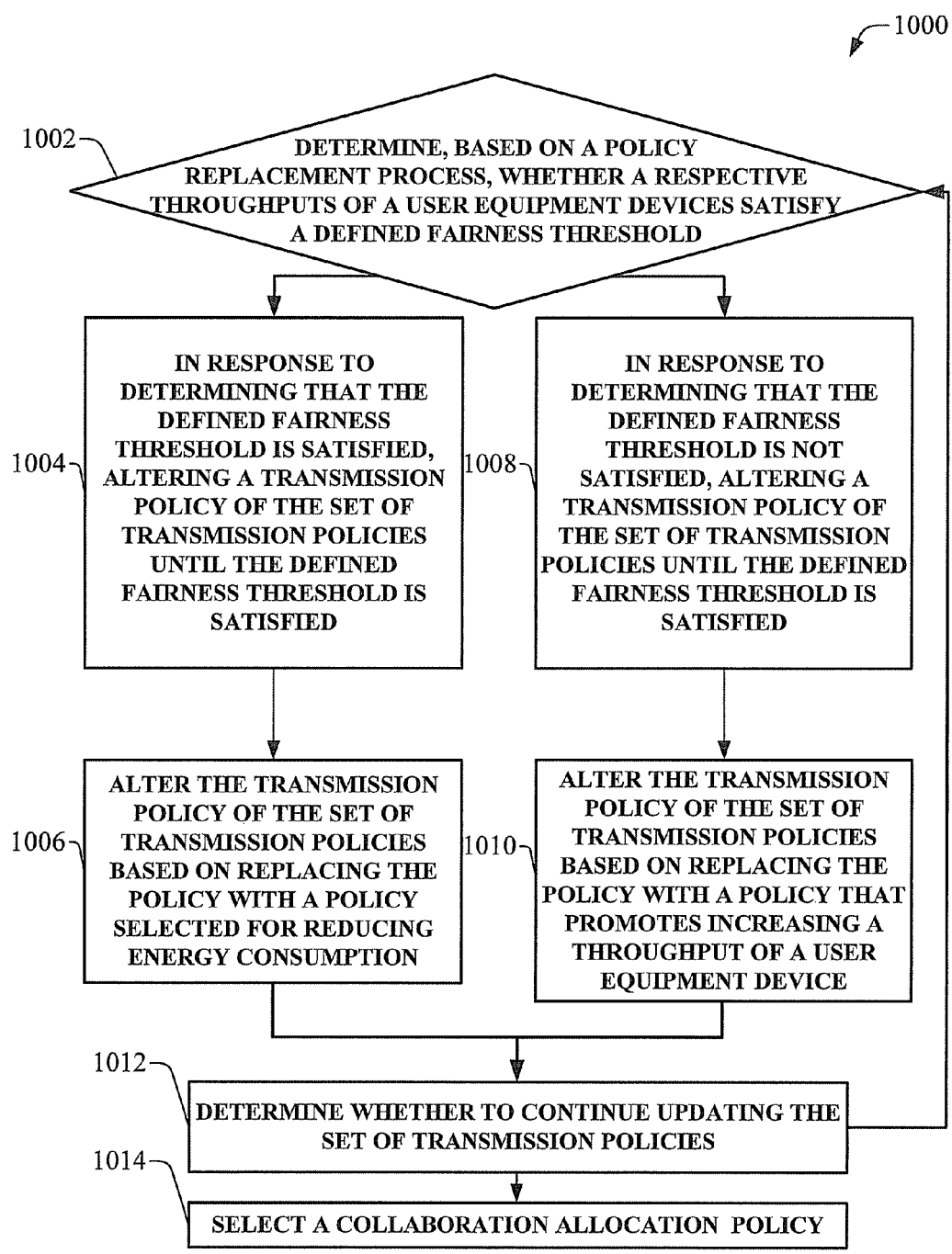
FIG. 10 illustrates an example, non-limiting method, for generating a collaboration allocation policy, based on a policy replacement selection policy, for a wireless network environment, according to aspects disclosed herein.

FIG. 10 illustrates an example, non-limiting method 1000 for generating a collaboration allocation policy, based on a policy replacement selection policy, for a wireless network environment, in accordance with various aspects disclosed herein. For example, method 1000 can comprise a method, implemented by one or more network devices, that facilitates a genetic selection policy for generating a collaboration agreement policy.

The method 1000 can initiate at 1002. At reference numeral 1002, a system comprising a processor, can determine (e.g., via a coordination component), based on the policy replacement process, whether a respective throughputs of a user equipment devices satisfy a defined fairness threshold.

For example, a system can determine that equation 1.10 is satisfied. If the threshold is satisfied the method can continue at 1004. If the threshold is not satisfied the method can continue at 1008.

At 1004, in response to determining that the defined fairness threshold is satisfied, a system can select (e.g., via a coordination component), altering a transmission policy of the set of transmission policies until at least one of the energy efficiency is not improved or the defined fairness threshold is not satisfied. For example, a system can determine that equation 1.10 is satisfied and in response, can select a no-cooperation policy or a joint transmission policy of a coordination agreement policy as a candidate policy. Selecting the policy as a candidate policy can comprise indicating the policy will be altered and/or replaced by an interference-coordination policy. In embodiments, the candidate policy can be selected based on a policy type, a network measurement (e.g., energy consumption associated with the policy, throughput associated with the policy, channel characteristics, etc.). For example, a system can select a policy for replacement based on equation 1.8.

At 1006, a system can alter (e.g., via a coordination component) the transmission policy of the set of transmission policies based on replacing the policy with a policy selected for reducing energy consumption. Altering the transmission policy can comprise replacing a candidate policy with a different policy (e.g., interference coordination), de-allocating a sub-carrier, updating a coordination policy, and the like. It is noted that various other types of policies and/or variations of policies can be selected to replace the candidate policy. In an embodiment, a system can select a replacement based on equation 1.8 and updated a coordination agreement according to equation 1.9.

At 1008, in response to determining that the defined fairness threshold is not satisfied, a system can select (e.g., via a coordination component), altering a transmission policy of the set of transmission policies until the defined fairness threshold is satisfied. For example, a system can determine that equation 1.10 is not satisfied and in response, can select an interference-coordination policy and/or no-cooperation policy as a candidate policy to be replaced by a joint transmission policy. In embodiments, the candidate policy can be selected based on a policy type, a network measurement (e.g., energy consumption associated with the policy, throughput associated with the policy, channel characteristics, etc.). For example, a system can select a policy for replacement and can select a policy to replace the candidate policy based on equation 1.11.

At 1010, a system can alter (e.g., via a coordination component) the transmission policy of the set of transmission policies based on replacing the policy with a policy that promotes increasing a throughput of a user equipment device. Altering the transmission policy can comprise replacing a candidate policy with a different policy (e.g., joint-transmission, no-coordination, etc.), allocating a sub-carrier, updating a transmission policy, and the like. It is noted that various other types of policies and/or variations of policies can be selected to replace the candidate policy. In an embodiment, a system can select a policy for replacement and can select a policy to replace the candidate policy based on equation 1.11.

At 1012, a system can determine (e.g., via a coordination component) whether to continue updating the set of transmission policies. For example, a system can determine if a threshold number of changes have been made, if an energy efficiency metric has not improved and/or improved above a threshold level for a period of time and/or alterations, if a change would result in repeating a past coordination agreement policy, and/or other policy replacement selection criteria. If a policy should be replaced, according to policy replacement selection criteria, method 1000 can continue at 1002. In another aspect, if a policy should not be replace method 1000 can continue to 1014.

At 1014, a system can select (e.g., via a coordination component) a collaboration allocation policy. In an embodiment, the final coordination agreement policy can be the last output coordination agreement policy. In another embodiment, a list of best transmission policies can be monitored and/or stored. The system can then select the best transmission policy based on a selection metric (e.g., highest efficiency while meeting a minimum fairness, combined weighted score of throughput and energy efficiency, etc.).

Figure 11:
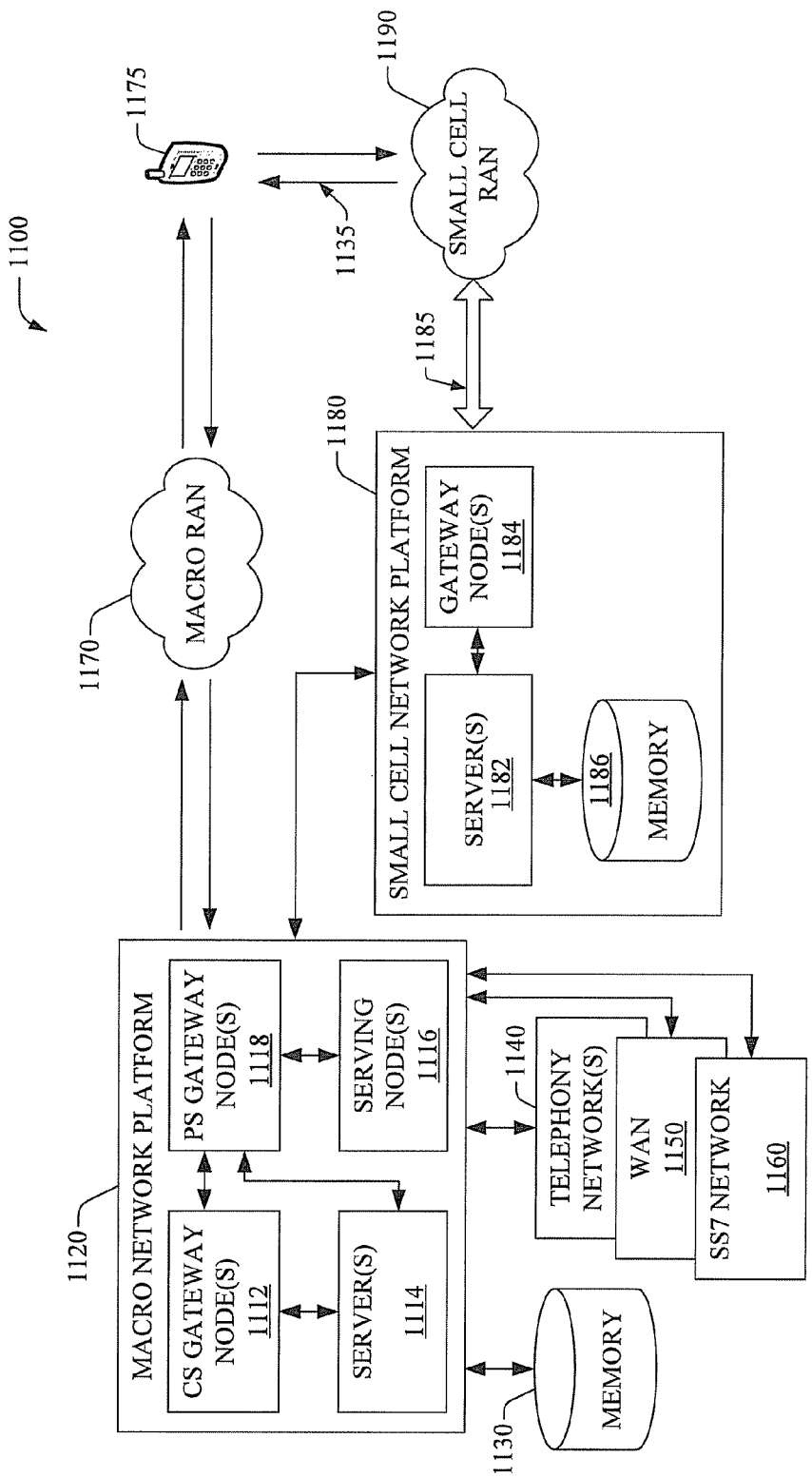
FIG. 11 illustrates a schematic deployment of a macrocell and a small cell for wireless coverage in accordance with aspects of the disclosure.
Figure 12:
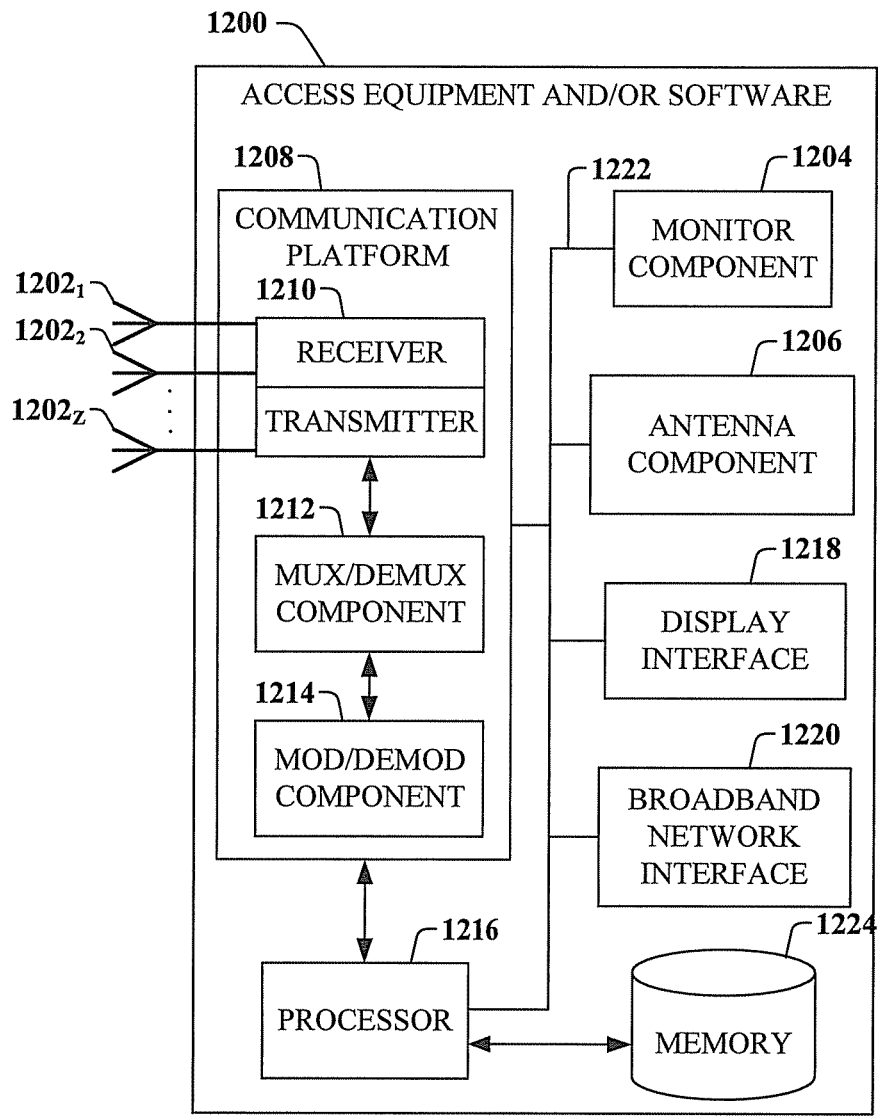
FIG. 12 illustrates a block diagram of access equipment and/or software related to access of a network, in accordance with an embodiment.

To provide further context for various aspects of the subject specification, FIGS. 11 and 12 illustrate, respectively, an example wireless communication environment 1100 and a block diagram of an embodiment of access equipment and/or software 1200 related to access of a network (e.g., base station, wireless access point, femtocell access point, and so forth) that can enable and/or exploit features or aspects of the disclosed aspects.

Wireless communication environment 1100 includes two wireless network platforms: (i) A macro network platform 1120 that serves, or facilitates communication) with user equipment 1175 via a macro radio access network (RAN) 1170. It should be appreciated that in cellular wireless technologies (e.g., 3GPP UMTS, HSPA, 3GPP LTE, 3GPP UMB, 4G LTE, etc.), macro network platform 1120 is embodied in a Core Network. (ii) A small cell network platform 1180, which can provide communication with user equipment 1175 through a small cell RAN 1190 linked to the small cell network platform 110 via backhaul link(s) 1185. Further, user equipment 1175 can be substantially similar to user equipment 104, and can include functionality, as more fully described herein, for example, with regard to FIGS. 1-10. It can be noted that small cell network platform 1180 typically offloads user equipment 1175 from macro network, once user equipment 1175 attaches (e.g., through a macro-to-small cell handover that employs an augmented neighbor list) to small cell RAN.

It is noted that RAN includes eNBs, base station(s), or access point(s), and its associated electronic circuitry and deployment site(s), in addition to a wireless radio link operated in accordance with the eNB(s). Accordingly, macro RAN 1170 can comprise various coverage cells like cell 206, while small cell RAN 1190 can comprise multiple small cell access points like small cell access point 204. As mentioned above, it is to be noted that deployment density in small cell RAN 1190 is substantially higher than in macro RAN 1170.

Generally, both macro and small cell network platforms (1120 and 1180) can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1120 includes CS gateway node(s) 1112 which can interface CS traffic received from legacy networks like telephony network(s) 1140 (e.g., public switched telephone network (PSTN), or public land mobile network (PLMN)) or a SS7 network 1160. Moreover, CS gateway node(s) 1112 interfaces CS-based traffic and signaling and gateway node(s) 1118.

In addition to receiving and processing CS traffic and signaling, gateway node(s) 1118 can authorize and authenticate PS-based data sessions with served (e.g., through macro RAN) wireless devices. Data sessions can include traffic exchange with networks external to the macro network platform 1120, like wide area network(s) (WANs) 1150; it should be noted that local area network(s) (LANs) can also be interfaced with macro network platform 1120 through gateway node(s) 1118. Gateway node(s) 1118 generates packet data contexts when a data session is established. It should be further noted that the packetized communication can include multiple flows that can be generated through server(s) 1114. Macro network platform 1120 also includes serving node(s) 1116 that convey the various packetized flows of information, or data streams, received through gateway node(s) 1118. It is to be noted that server(s) 1114 can include one or more processor configured to confer at least in part the functionality of macro network platform 1120. To that end, the one or more processor can execute code instructions stored in memory 1130, for example.

In example wireless environment 1100, memory 1130 stores information related to operation of macro network platform 1120. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN(s) 1150, or SS7 network 1160.

Small cell gateway node(s) 1184 have substantially the same functionality as PS gateway node(s) 1118. Additionally, small cell gateway node(s) 1184 can also include substantially all functionality of serving node(s) 1116. In an aspect, small cell gateway node(s) 1184 facilitates handover resolution, e.g., assessment and execution. Server(s) 1182 have substantially the same functionality as described in connection with server(s) 1114 and can include one or more processors configured to confer at least in part the functionality of macro network platform 1120. Moreover, network server 314 can be part of server(s) 1182 and/or 1114. Further, the one or more processor can execute code instructions stored in memory 1186, for example.

Memory 1186 can include information relevant to operation of the various components of small cell network platform 110. For example operational information that can be stored in memory 1186 can comprise, but is not limited to, subscriber information; contracted services; maintenance and service records; small cell configuration (e.g., devices served through small cell RAN 1190; access control lists, or white lists); service policies and specifications; privacy policies; add-on features; small cell measurement data, and so forth Access equipment and/or software 1200 related to access of a network can receive and transmit signal(s) from and to wireless devices, wireless ports, wireless routers, etc. through segments $1202_1$-$1202_Z$ (Z is a positive integer). Segments $1202_1$-$1202_Z$ can be internal and/or external to access equipment and/or software 1200 related to access of a network, and can be controlled by a monitor component 1204 and an antenna component 1206. Monitor component 1204 and antenna component 1206 can couple to communication platform 1208, which can include electronic components and associated circuitry that provide for processing and manipulation of received signal(s) and other signal(s) to be transmitted.

In an aspect, communication platform 1208 includes a receiver/transmitter 1210 that can convert analog signals to digital signals upon reception of the analog signals, and can convert digital signals to analog signals upon transmission. In addition, receiver/transmitter 1210 can divide a single data stream into multiple, parallel data streams, or perform the reciprocal operation. Coupled to receiver/transmitter 1210 can be a multiplexer/demultiplexer 1212 that can facilitate manipulation of signals in time and frequency space. Multiplexer/demultiplexer 1212 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1212 can scramble and spread information (e.g., codes, according to substantially any code known in the art, such as Hadamard-Walsh codes, Baker codes, Kasami codes, polyphase codes, and so forth).

A modulator/demodulator 1214 is also a part of communication platform 1208, and can modulate information according to multiple modulation techniques, such as frequency modulation, amplitude modulation (e.g., M-ary quadrature amplitude modulation, with M a positive integer); phase-shift keying; and so forth.

Access equipment and/or software 1200 related to access of a network also includes a processor 1216 configured to confer, at least in part, functionality to substantially any electronic component in access equipment and/or software 1200. In particular, processor 1216 can facilitate configuration of access equipment and/or software 1200 through, for example, monitor component 1204, antenna component 1206, and one or more components therein. Additionally, access equipment and/or software 1200 can include display interface 1218, which can display functions that control functionality of access equipment and/or software 1200, or reveal operation conditions thereof. In addition, display interface 1218 can include a screen to convey information to an end user. In an aspect, display interface 1218 can be a liquid crystal display, a plasma panel, a monolithic thin-film based electrochromic display, and so on. Moreover, display interface 1218 can include a component (e.g., speaker) that facilitates communication of aural indicia, which can also be employed in connection with messages that convey operational instructions to an end user. Display interface 1218 can also facilitate data entry (e.g., through a linked keypad or through touch gestures), which can cause access equipment and/or software 1200 to receive external commands (e.g., restart operation).

Broadband network interface 1220 facilitates connection of access equipment and/or software 1200 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1220 can be internal or external to access equipment and/or software 1200, and can utilize display interface 1218 for end-user interaction and status information delivery.

Processor 1216 can be functionally connected to communication platform 1208 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1216 can be functionally connected, through data, system, or an address bus 1222, to display interface 1218 and broadband network interface 1220, to confer, at least in part, functionality to each of such components.

In access equipment and/or software 1200, memory 1224 can retain location and/or coverage area (e.g., macro sector, identifier(s)) access list(s) that authorize access to wireless coverage through access equipment and/or software 1200, sector intelligence that can include ranking of coverage areas in the wireless environment of access equipment and/or software 1200, radio link quality and strength associated therewith, or the like. Memory 1224 also can store data structures, code instructions and program modules, system or device information, code sequences for scrambling, spreading and pilot transmission, access point configuration, and so on. Processor 1216 can be coupled (e.g., through a memory bus), to memory 1224 in order to store and retrieve information used to operate and/or confer functionality to the components, platform, and interface that reside within access equipment and/or software 1200.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1224, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 13:
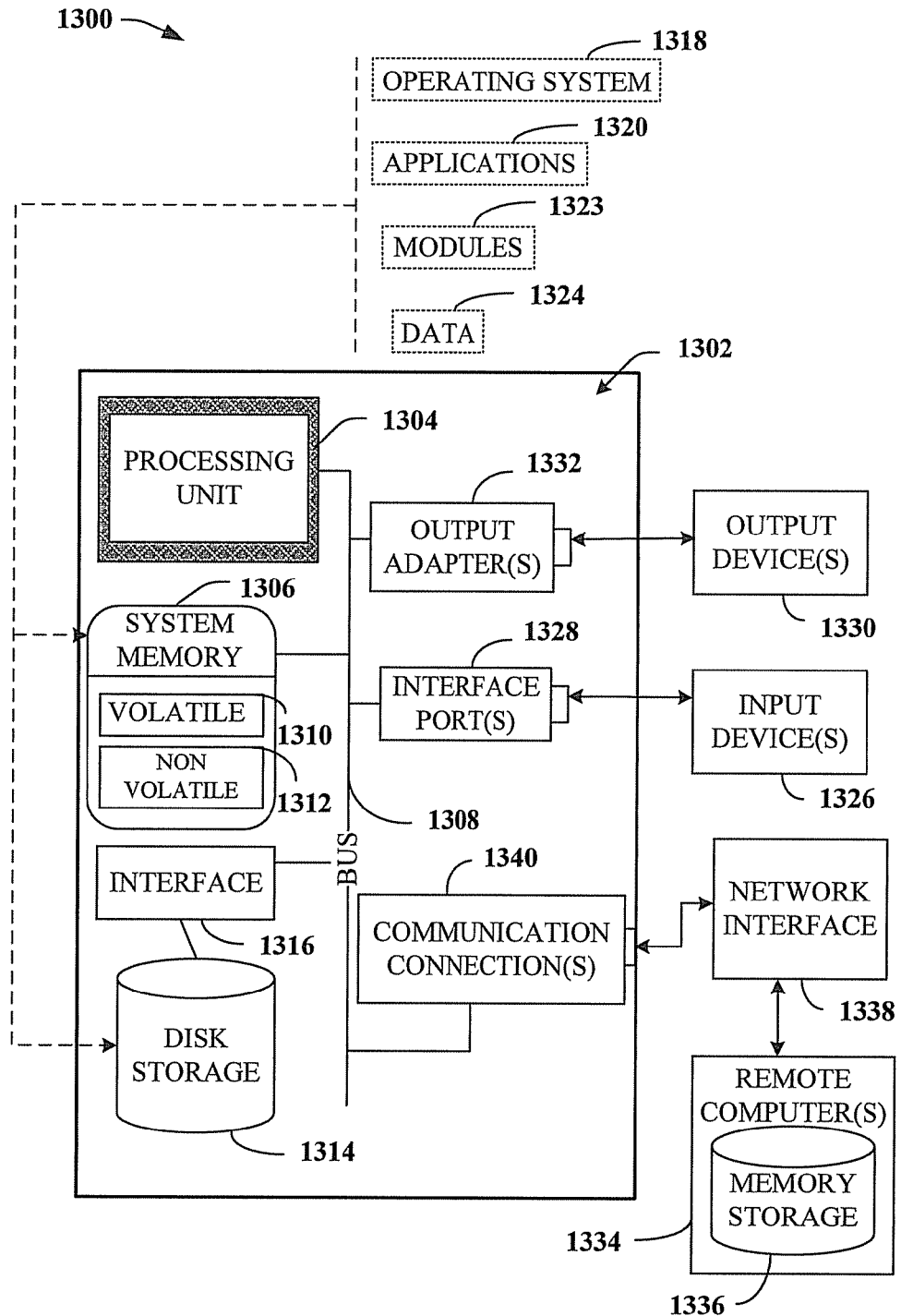
FIG. 13 illustrates a block diagram of a computing system, in accordance with an embodiment.

In order to provide further a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that performs particular tasks and/or implement particular abstract data types. For example, in memory there can be software, which can instruct a processor to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 13, a block diagram of a computing system 1300 operable to execute the disclosed systems and methods is illustrated, in accordance with an embodiment. Computer 1302 includes a processing unit 1304, a system memory 1306, and a system bus 1308. System bus 1308 couples system components including, but not limited to, system memory 1306 to processing unit 1304. Processing unit 1304 can be any of various available processors. Dual microprocessors and other multiprocessor architectures also can be employed as processing unit 1304.

System bus 1308 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire and small computer systems interface.

System memory 1306 includes volatile memory 1310 and nonvolatile memory 1312. A basic input/output system, containing routines to transfer information between elements within computer 1302, such as during start-up, can be stored in nonvolatile memory 1312. By way of illustration, and not limitation, nonvolatile memory 1312 can include read only memory, programmable read only memory, electrically programmable read only memory, electrically erasable programmable read only memory, or flash memory. Volatile memory 1310 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1302 also includes removable/non-removable, volatile/non-volatile computer storage media. In an implementation, provided is a non-transitory or tangible computer-readable medium storing executable instructions that, in response to execution, cause a system comprising a processor to perform operations. The operations can include comparing a first network congestion condition and a first network parameter condition received from a first set of network devices of a first network, and a second network congestion condition and a second network parameter condition received from a second set of network devices of a second network to a usage parameter and a movement parameter of a mobile device. The operations can also include determining a radio technology (e.g., radio network device) to which to route network traffic of the mobile device. Determining the routing of the network traffic can include, based on a first outcome of the comparing, determining to route the network traffic to the first set of network devices associated with a first radio technology. In another example, determining the routing of the network traffic can include, based on a second outcome of the comparing, determining to route the network traffic of the mobile device to the second set of network devices associated with a second radio technology. In an implementation, determining the set of network devices can include complying with a network selection policy received from a network device that provides a service to the mobile device. Further, the operations can include facilitating routing of the network traffic of the mobile device to the set of network devices.

In an implementation, the operations can include analyzing relative movement of the mobile device with respect to the first set of network devices and the second set of network devices. According to another implementation, the operations can include determining speed data representing a substantially current speed of the mobile device and direction data representing a substantially current direction of the mobile device.

FIG. 13 illustrates, for example, disk storage 1314. Disk storage 1314 includes, but is not limited to, devices such as a magnetic disk drive, floppy disk drive, tape drive, external or internal removable storage drives, super disk drive, flash memory card, or memory stick. In addition, disk storage 1314 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1314 to system bus 1308, a removable or non-removable interface is typically used, such as interface component 1316.

It is to be noted that FIG. 13 describes software that acts as an intermediary between users and computer resources described in suitable operating environment. Such software includes an operating system 1318. Operating system 1318, which can be stored on disk storage 1314, acts to control and allocate resources of computer system 1302. System applications 1320 can take advantage of the management of resources by operating system 1318 through program modules 1322 and program data 1324 stored either in system memory 1306 or on disk storage 1314. It is to be understood that the disclosed subject matter can be implemented with various operating systems or combinations of operating systems.

A user can enter commands or information, for example through interface component 1316, into computer system 1302 through input device(s) 1326. Input devices 1326 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1304 through system bus 1308 through interface port(s) 1328. Interface port(s) 1328 include, for example, a serial port, a parallel port, a game port, and a universal serial bus. Output device(s) 1330 use some of the same type of ports as input device(s) 1326.

Thus, for example, a universal serial bus port can be used to provide input to computer 1302 and to output information from computer 1302 to an output device 1330. Output adapter 1332 is provided to illustrate that there are some output devices 1330, such as monitors, speakers, and printers, among other output devices 1330, which use special adapters. Output adapters 1332 include, by way of illustration and not limitation, video and sound cards that provide means of connection between output device 1330 and system bus 1308. It is also noted that other devices and/or systems of devices provide both input and output capabilities such as remote computer(s) 1334.

Computer 1302 can operate in a networked environment using logical connections to one or more remote computers, such as remote computer(s) 1334. Remote computer(s) 1334 can be a personal computer, a server, a router, a network computer, a workstation, a microprocessor based appliance, a peer device, or other common network node and the like, and typically includes many or all of the elements described relative to computer 1302.

For purposes of brevity, only one memory storage device 1336 is illustrated with remote computer(s) 1334. Remote computer(s) 1334 is logically connected to computer 1302 through a network interface 1338 and then physically connected through communication connection 1340. Network interface 1338 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1340 refer(s) to hardware/software employed to connect network interface 1338 to system bus 1308. While communication connection 1340 is shown for illustrative clarity inside computer 1302, it can also be external to computer 1302. The hardware/software for connection to network interface 1338 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra-mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
a memory that stores executable components; and
a processor communicatively coupled to the memory, the processor configured to facilitate execution of the executable components, the executable components comprising:
   a collaboration coordination component configured to determine a collaboration allocation policy for allocating network resources of a network to a set of user equipment devices, wherein the collaboration allocation policy comprises a set of transmission policies respectively associated with the set of user equipment devices; and
   a fairness scheduler component configured to allocate the network resources to the set of user equipment devices based at least in part on the collaboration allocation policy,
wherein the collaboration coordination component is further configured to select the collaboration allocation policy based on throughput data, metric data, and at least one transmission policy of the set of transmission policies for a user equipment device of the set of user equipment devices, and
wherein the set of transmissions policies comprise a policy that assigns the user equipment device of the set of user equipment devices to a specific sub-carrier of a cell of a network device of the network.

2. The system of claim 1, wherein the fairness scheduler component is further configured to allocate the network resources based on the metric data representing an energy efficiency of the network and the throughput data representing respective throughputs associated with the set of user equipment devices.

3. The system of claim 1, wherein the collaboration coordination component is further configured to select the at least one transmission policy based on data representing a characteristic of a channel of the network, and wherein the channel is associated with the user equipment device.

4. The system of claim 1, wherein the collaboration coordination component is further configured to determine the respective transmissions policies of the set of transmission polices based on an interference determined to be present within the network.

5. The system of claim 1, wherein the collaboration coordination component is further configured to select the at least one transmission policy of the set of transmission policies for respective user equipment devices of the set of user equipment devices on at least one of a per sub-carrier or per time slot basis.

6. The system of claim 1, wherein the set transmissions policies comprise a policy that directs a set of network devices of the network to transmit identical data to the user equipment device, of the set of user equipment devices, utilizing at least one of a specific sub-carrier or a per time slot basis.

7. The system of claim 1, wherein the set of transmissions policies comprise a policy that prohibits assigning a second user equipment device of the set of user equipment device to the specific sub-carrier of a second cell of the network device of the network.

8. The system of claim 1, wherein the collaboration coordination component is further configured to determine the set of transmission policies for the set of user equipment devices across a set of base station devices.

9. The system of claim 1, wherein the executable components further comprise: an evaluation component configured to determine metric data based on a function of a total throughput of data through the set of user equipment devices and a total power consumption associated with the network resources.

10. The system of claim 9, wherein the evaluation component is further configured to determine the metric data representing the respective throughputs associated with the set of user equipment devices based on respective signal to noise values.

11. The system of claim 1, wherein the executable components further comprise: a control component configured to control availability of the network resources based on at least one of respective signal to noise values, the metric data, or the throughput data representing respective throughputs associated with the set of user equipment devices.

12. The system of claim 1, wherein the fairness scheduler component is further configured to allocate the network resources to the set of user equipment devices based on respective signal to noise values.

13. The system of claim 1, wherein the set of user equipment devices attempt to receive the network resource assignment from a specific network device of the set of network devices.

14. The system of claim 1, wherein the network resources and a set of sub-carriers of the network are associated with small cell network devices of the network.

15. The system of claim 1, wherein a network device of the network utilizes disparate transmission powers for transmissions associated with disparate transmission policies of the collaboration allocation policy.

16. A system, comprising:
a memory that stores executable components; and
a processor, communicatively coupled to the memory, the processor configured to facilitate execution of the executable components, the executable components comprising:
   a collaboration coordination component configured to select a collaboration allocation policy comprising a set of transmission policies as a function of metric data representing an energy efficiency metric for a set of user equipment devices that have respective throughputs that are above a threshold value, wherein the set of transmission policies are respectively associated with the set of user equipment devices; and
   a fairness scheduler component configured to allocate network resources of a network to the set of user equipment devices based at least in part on the collaboration allocation policy.

17. A method, comprising:
determining, by a system comprising a processor device, a collaboration allocation policy for allocating network resources of a network user equipment devices based on a genetic selection process, wherein the collaboration allocation policy comprises a set of transmission policies respectively associated with the set of user equipment devices; and allocating, by the system, the network resources based on the collaboration allocation policy, metric data representing an energy efficiency metric of the network and throughput data representing respective throughputs associated with the user equipment devices, wherein the set of transmissions policies comprise a policy that assigns a user equipment device of the set of user equipment devices to a specific sub-carrier of a cell of a network device of the network.

18. The method of claim 17, wherein the determining the collaboration allocation policy comprises determining the collaboration allocation policy based on a set of parameters representing a set of conditions of the network.

19. The method of claim 18, wherein the set of parameters comprise a set of values representing at least one of a signal to noise ratio, a signal strength, or a throughput threshold or total power consumption of the collaboration allocation policy in the network.

20. The method of claim 17, wherein the determining the collaboration allocation policy comprises determining the set of transmission policies per time slot for the user equipment devices.

21. The method of claim 19, wherein the determining the collaboration allocation policy comprises determining the collaboration allocation policy for allocating the network resources of a set of base station devices.

22. The method of claim 19, wherein the determining the collaboration allocation policy for allocating the network resources to the user equipment devices comprises determining the collaboration allocation policy for a small cell network device of the network.

23. A method, comprising:
generating, by a system comprising a processor device, a first generation set of collaboration allocation policies;
selecting, by the system, a subset of the first generation set of collaboration allocation policies as a function of metric data representing an energy efficiency metric of a network and throughput data representing respective throughputs associated with user equipment devices;
generating, by the system, a second generation set from the subset of the first generation set of collaboration allocation policies as a function of transmission polices associated with the subset of the first generation set of collaboration allocation policies;
iterating the selecting the subset from generational sets until a predetermined number of generational sets are reached; and
selecting, from a further generational set, a deployable collaboration allocation policy, wherein the deployable collaboration allocation policy represents a candidate collaboration allocation policy of the further generational set having the energy efficiency metric above a threshold value.

24. The method of claim 23, wherein generating, by the system, the second generation set further comprises replacing at least one of the transmission policy of collaboration allocation policies with an alternate transmission policy selected from the first generation set of collaboration allocation policies.

25. A method, comprising:
determining, by a system comprising a processor device, a collaboration allocation policy based on a policy replacement process that selects a set of transmission policies for user equipment devices based on a performance metric representing energy consumption of a network and throughput data representing respective throughputs associated with the user equipment devices, wherein the collaboration allocation policy comprises the set of transmission policies that are used in connection with allocation of network resources by different network devices to the user equipment devices;
allocating, by the system, the network resources based on the collaboration allocation policy, metric data representing an energy efficiency metric of the network, and the throughput data representing the respective throughputs associated with the user equipment devices;
determining, based on the policy replacement process, whether the respective throughputs of the user equipment devices satisfy a defined fairness threshold; and
in response to determining that the defined fairness threshold is satisfied, altering a transmission policy of the set of transmission policies until the defined fairness threshold is not reached.

26. The method of claim 25, wherein the transmission policy to be altered is selected based on the metric data representing the energy efficiency associated with the transmission policy being determined to have reached a defined energy efficiency threshold.

27. The method of claim 25, further comprising:
in response to determining that the defined fairness threshold is not satisfied, altering a transmission policy of the set of transmission policies until the defined fairness threshold is satisfied.

28. A non-transitory computer readable storage medium comprising instructions that, in response to execution, cause a system comprising a processor to perform operations, comprising:
determining a collaboration allocation policy for allocation of network resources of a set of network devices to user equipment devices based on metric data representing an energy efficiency of the set of network devices and throughput data representing respective throughputs associated with the user equipment devices; and
allocating the network resources of the set of network devices based on the collaboration allocation policy,
wherein the set of transmissions policies comprise a policy that assigns a user equipment device of the set of user equipment devices to a specific sub-carrier of a cell of a network device of the network.

29. The non-transitory computer readable storage medium of claim 28, wherein the operations further comprise: in response to detecting a change of a parameter of a network device of the set of network devices, re-determining the collaboration allocation policy.

30. The non-transitory computer readable storage medium of claim 28, wherein the determining the collaboration allocation policy comprises determining altered metric data representing the energy efficiency.

31. The non-transitory computer readable storage medium of claim 28, wherein the operations further comprise: altering an availability of the network resources to the user equipment devices based on the collaboration allocation policy.

32. The non-transitory computer readable storage medium of claim 28, wherein the determining the collaboration allocation policy comprises selecting a set of transmission policies comprising:

a no-coordination policy wherein the user equipment devices are respectively served by a respective sub-carrier of a respective network device of the set of network devices;

a joint-transmission policy wherein at least two network devices of the set of network devices transmit data to a user equipment device of the user equipment devices via respective sub-carriers of the at least two network devices; or an interference coordination policy wherein a first network device of the set of network devices alters availability of a first sub-carrier of the first network device based on an interference being determined to have affected a second sub-carrier of a second network device.

33. The non-transitory computer readable storage medium of claim 28, wherein a network device of the set of network devices utilize disparate transmission powers per sub-carrier based at least in part on the collaboration allocation policy.

34. The non-transitory computer readable storage medium of claim 28, wherein the selecting the set of transmission policies comprises selecting the collaboration allocation policy based on a policy replacement process that selects the set of transmission policies for the user equipment devices based on the metric data representing the energy efficiency of the set of network devices and a throughput threshold value.

35. A method, comprising:
receiving, by a user equipment device comprising a processor, a first instruction, based on a collaboration allocation policy that identifies a first sub-carrier of a network device of a network to utilize for transmissions;

receiving, by the user equipment device, data via the first sub-carrier, based on the first instruction; and receiving, by the user equipment device, a second instruction that identifies a second sub-carrier of a disparate network device of the network to utilize for transmissions, based on the collaboration allocation policy, throughput data describing a throughput associated with the device, and metric data representing an energy efficiency metric.

36. The method of claim 35, wherein the collaboration allocation policy comprises a set of transmission policies respectively associated with disparate network devices.

37. The method of claim 36, wherein the disparate network devices comprise a small cell network device of the network.

* * * * *